United States Patent
Inayama et al.

(10) Patent No.: US 6,956,312 B2
(45) Date of Patent: Oct. 18, 2005

(54) BRUSHLESS DC MOTOR AND METHOD OF MANUFACTURING BRUSHLESS DC MOTOR

(75) Inventors: Hirohide Inayama, Yamatokoriyama (JP); Hideki Jonokuchi, Kashihara (JP); Sadaaki Mori, Mie (JP); Atsushi Ishihara, Headington (GB); Tomofumi Takahashi, Komaki (JP); Minoru Kitabayashi, Nagoya (JP); Tetsuo Horie, Kasugai (JP)

(73) Assignee: Koyo Seiko Co., Ltd., Osaka (JP)

( * ) Notice: Subject to any disclaimer, the term of this patent is extended or adjusted under 35 U.S.C. 154(b) by 177 days.

(21) Appl. No.: 10/068,344

(22) Filed: Feb. 6, 2002

(65) Prior Publication Data

US 2002/0140308 A1 Oct. 3, 2002

(30) Foreign Application Priority Data

| Feb. 14, 2001 | (JP) | ............................................. 2001-37560 |
| Mar. 5, 2001 | (JP) | ............................................. 2001-60989 |
| Jun. 20, 2001 | (JP) | ............................................. 2001-185927 |

(51) Int. Cl.$^7$ ............................................. H02K 21/12
(52) U.S. Cl. ..................... 310/156.41; 310/101; 29/596
(58) Field of Search ............................. 310/156.47, 101, 310/47, 49 R, 1; 29/596

(56) References Cited

U.S. PATENT DOCUMENTS

| 4,739,201 A | * | 4/1988 | Brigham et al. ............ 310/49 R |
| 4,841,186 A | * | 6/1989 | Feigel et al. ............ 310/156.12 |
| 5,010,266 A | * | 4/1991 | Uchida .................. 310/156.22 |
| 5,397,951 A | * | 3/1995 | Uchida et al. ......... 310/156.21 |
| 5,463,262 A | * | 10/1995 | Uchida .................. 310/156.61 |
| 5,760,503 A | * | 6/1998 | Tsuchida et al. .......... 310/49 R |
| 6,252,323 B1 | * | 6/2001 | Nishikawa et al. .... 310/156.01 |
| 6,262,507 B1 | * | 7/2001 | Sato et al. .................. 310/152 |
| 6,380,654 B1 | * | 4/2002 | Dokonal et al. ....... 310/156.53 |
| 6,519,833 B2 | * | 2/2003 | Futami et al. ................ 29/596 |

FOREIGN PATENT DOCUMENTS

| DE | 41 33 723 | 4/1993 |
| DE | 10016002 | 11/2000 |

* cited by examiner

*Primary Examiner*—Joseph Waks
(74) *Attorney, Agent, or Firm*—Darby & Darby

(57) ABSTRACT

A brushless DC motor including a stator having plural slots; and a rotor which has plural permanent magnets and is divided into three rotor blocks in a rotation axis direction, the three rotor blocks being layered so that the arrangement angles of the rotor blocks differ from each other by an amount of a mechanical angle in a rotary direction that is equivalent to one third of a pulsation period of cogging torque generated by the rotor and stator. A brushless DC motor including a rotor having plural magnetic poles provided at an equal pitch in a circumferential direction by mounting permanent magnets in magnet mounting holes; and a stator having plural slots arranged at an equal pitch in a circumferential direction. The magnetic poles of the rotor include magnetic poles whose magnet deviation angle formed by the central line of an effective polar opening angle and the central line of the magnet mounting hole is the first angle; and magnetic poles whose magnet deviation angle is the second angle different from the first angle.

3 Claims, 33 Drawing Sheets

FIG. 14B  θp: POLE PITCH ANGLE
θm: EFFECTIVE POLAR OPENING ANGLE

BRUSHLESS DC MOTOR AND METHOD OF MANUFACTURING BRUSHLESS DC MOTOR

BACKGROUND OF THE INVENTION

The present invention relates to a brushless DC motor comprising a rotor having permanent magnets, and more particularly relates to a brushless DC motor capable of reducing cogging torque and a manufacturing method of the same.

A brushless DC motor is a motor that comprises a rotor having permanent magnets and rotates the rotor by controlling an electric commutator circuit for generating a rotational magnetic field in a stator, based on a detection signal representing the rotational position of the rotor. Since the brushless DC motor does not generate mechanical and electrical noises and has high rotary performance and a long life, it is mainly used in the cylinder of a VTR, the capstan of a cassette tape deck, a flexible disk driver, a CD player, etc. In recent years, the brushless DC motor is used in the drive motor of a power steering apparatus for vehicle.

In the brushless DC motor, torque pulsation, i.e., cogging torque, is unavoidably produced because of the presence of slots for winding in the stator and the presence of permanent magnets in the rotor. The cogging torque is a periodical torque change that is caused in a motor by a change of magnetic flux owing to the position of the rotor.

Conventionally, as a method for preventing the cogging torque of a brushless DC motor, there has been a proposed method for reducing cogging torque by dividing the rotor into two blocks and combining the two blocks while displacing the arrangement angle of the rotor blocks in a circumferential direction so that cogging torques generated in the two blocks are mutually in antiphase with respect to the rotation of the rotor.

FIG. 1 is an explanatory view showing an anti-cogging measure taken by such a rotor, and shows a perspective view of a rotor 105 as an assembly of an upper-stage rotor block 110 and a lower-stage rotor block 120. The rotor block 110 comprises an internal rotor core 112, and four permanent magnets 111 attached to the outer circumference of the rotor core 112 at equal intervals. The rotor block 120 comprises an internal rotor core 122, and four permanent magnets 121 attached to the outer circumference of the rotor core 122 at equal intervals.

The rotor blocks 110 and 120 are of the same constructions and combined in an axial direction while displacing the arrangement angles by an amount of a mechanical angle θ12 at which they are mutually in antiphase with respect to a pulsation period of cogging torque generated by the relationship with an opposing stator. Accordingly, the pulsation components of cogging torques generated in the rotor blocks 110 and 120 cancel each other out, thereby reducing the cogging torque of the brushless DC motor.

FIG. 2 is a view showing the relationship between the conventional rotor blocks 110, 120 and the stator as a cross section in a direction perpendicular to the rotary shaft. A stator 101 is formed by layering a number of thin electromagnetic steel plates and fixing them integrally, and comprises a yoke 102 as an outer circumferential portion and teeth 103 that are provided at equal intervals to protrude from the yoke 102 toward the center. Adjacent teeth 103 form a slot 104 together with the yoke 102. Actually, armature windings are wound on the teeth 103 and stored in the slots 104.

FIGS. 3A and 3B are waveform charts for explaining the above-mentioned anti-cogging torque measure. The vertical axis indicates cogging torque, while the horizontal axis shows the rotation angle of the rotor 105. Each of cogging torque Tc1 generated in the upper-stage rotor block 110 and cogging torque Tc2 generated in the lower-stage rotor block 120 has a pulsation period θ11.

In the case where the cogging torques Tc1 and Tc2 are such sinusoidal waveforms that have the same change in an increasing direction and a decreasing direction with respect to the center of amplitude, if the rotor blocks 110 and 120 are combined to have a phase shift corresponding to a half period θ12 of the pulsation period θ11, the pulsation components of the cogging torques Tc1 and Tc2 of the rotor blocks 110 and 120 cancel each other out and, ideally, their composite cogging torque Tct is made a straight waveform having no pulsation as shown in FIG. 3B.

A prerequisite for effectively realizing the above-mentioned method is that the pulsation waveforms of the cogging torques Tc1 and Tc2 generated in the respective rotor blocks 110 and 120 are mutually in antiphase in the moving direction of the rotor with respect to the center of the amplitude and have magnitudes so that the cogging torques Tc1 and Tc2 cancel each other out. In an actual brushless DC motor, it is possible to significantly improve the pulsation period of cogging torque by the above-mentioned method, but there is a problem that small cogging torque pulsation remains. In order to improve such small cogging torque and design a brushless DC motor having no distortion in the rotational operation, conventionally an abrupt change of cogging torque is prevented and the pulsation is restricted by widening the gap between the rotor and the stator to a large extent, providing unequal gaps in the circumferential direction and intentionally leaking a part of magnetic flux from the permanent magnets of the rotor near the region between the magnetic poles. However, the motor efficiency is sacrificed.

FIGS. 4A and 4B are waveform charts for explaining the influence of such an anti-cogging torque measure, in which the same codes as in FIGS. 3A and 3B are used. The pulsation of the cogging torques Tc1 and Tc2 is caused by a change of magnetic flux distribution which occurs between the permanent magnets 111, 121 and the stator 101 with respect to the rotary direction of the rotor 105. In particular, the presence of the openings of the slots 104 of the stator largely affects this change. There is a difference in the magnetic flux distribution in the magnetic path of the stator 101 and the rotor 105 between the case where the region between the magnetic poles of the rotor 105 approaches the opening of the slot 104 and the case where the region between the magnetic poles moves away form the opening. As a result, there is a possibility that the pulsation of cogging torque does not become a sinusoidal waveform having the same change in the increasing direction and the decreasing direction with respect to the center of amplitude.

Moreover, in an ordinary motor structure, the opening of the slot 104 of the stator 101 is narrowed to ensure an interlinkage magnetic flux from the rotor 105 to the stator 101, and the width of the tooth 103 is made larger than the width of the opening of the slot 104 so as to realize high torque and high efficiency. Therefore, the cogging torque has a small change in a section where the region between magnetic poles of the rotor 105 faces the tooth 103 during the rotational movement, but a large change in a section where the region faces the opening of the slot 104. Thus, as shown in FIG. 4A, waveform distortion including even harmonics symmetrical about a point may be caused. Even if the pulsations of such cogging torque waveforms are combined while displacing them by an amount corresponding to the half period θ12 of the pulsation period θ11, there is a problem that the pulsation of cogging torque as shown in FIG. 4B still remains.

The cogging torque Tct of the rotor obtained by dividing the rotor into two blocks and layering the blocks while displacing them by an amount corresponding to the half period θ12 of the pulsation period θ11 of cogging torque is shown by expression (1). Here, T0 is a peak value of a fundamental wave component of cogging torque when the rotor is not divided, x is an electrical angle of the angle of an arbitrary rotational position of the rotor, n is a natural number, and kn is the ratio of the 2n-th harmonics content to the fundamental wave.

$$Tct = T0/2 \left\{ \sin(x) + \sum_{n=1}^{\infty} kn \cdot \sin(2nx) + \right.$$
$$\left. \sin(x+\pi) + \sum_{n=1}^{\infty} kn \cdot \sin(2nx + 2n\pi) \right\}$$
$$= T0 \sum_{n=1}^{\infty} kn \cdot \sin(2nx) \qquad (1)$$

It is apparent from the expression (1) that, in the brushless DC motor comprising the rotor divided into two blocks, the fundamental wave components of cogging torques cancel each other out and are thus eliminated, but there is a problem that the even harmonics components remain.

There is another conventional anti-cogging torque measure shown in FIG. 5, for example. In FIG. 5, the same parts as those shown in FIG. 2 are designated with the same numbers. In the example shown in FIG. 5, one with an outer circumference having a curvature larger than the curvature of the outer circumference of the rotor core 106 is used as the permanent magnet 107 of the rotor 105. Moreover the gap between the permanent magnet 107 and the teeth 103 of the stator 101 gradually increases from the center toward the ends of the permanent magnet 107 in the circumferential direction. Therefore, when the rotor core 106 rotates, the magnetic flux interlinking with the teeth 103 changes smoothly instead of stepwise. Thus, a reduction in cogging torque is made. Some countermeasure produces a similar effect by changing the shape of the outer circumference of the rotor core 106 instead of changing the shape of the permanent magnets 107.

FIG. 6 shows still another conventional anti-cogging torque measure. In the example shown in FIG. 6, a skew angle θS is provided for the arrangement of magnetic poles in the axial direction of the rotor 105. Hence, when the rotor 105 rotates, the timing in which the boundary between the magnetic poles crosses the teeth of the stator varies according to a position in the axial direction of the rotor 105. Thus, the change of the magnetic flux interlinking with the teeth is made moderate, and the cogging torque is reduced.

However, both of the conventional techniques shown in FIGS. 5 and 6 suffer from problems including poor magnetic efficiency. In the technique shown in FIG. 5, since the average gap between the permanent magnets 107 and the teeth 103 is large, the magnetic efficiency is poor and a rotary output proportional to the magnetic force of the permanent magnets 107 can not be obtained. Moreover, it is necessary to perform various analysis and trial manufacture to determine the shape of the permanent magnets 107 or the outer circumference of the rotor core 106, resulting in high development costs. Furthermore, it is necessary to process the small configurations accurately, and thus the processing itself is difficult. Nevertheless, an objective to reduce the cogging torque is not sufficiently achieved. In particular, when strong rare-earth based permanent magnets are used to meet the demand for a reduction in size as in recent years, the cogging torque in itself is considerably large. Therefore, such a method is not sufficient.

Similarly, the technique shown in FIG. 6 suffers from poor magnetic efficiency and can not obtain a sufficient rotary output. The reason for this is that there is the skew angle θS in the arrangement of magnetic poles and consequently the effective magnetic flux of the magnetic poles becomes smaller by a corresponding amount. In the example shown in FIG. 6, one magnetic pole occupies substantially a parallelogram region on the side face of the rotor 105. In a portion near the acute apex, the magnetic flux in the portion does not effectively perform the function of the motor. Therefore, like the example shown in FIG. 5, this technique can not obtain a sufficient rotary output.

In recent years, the brushless DC motor is often made to have a small size and high output by using a rare-earth material, etc. for the permanent magnets, and tends to be used as a magnetic circuit in a high magnetic flux density region of the thin electromagnetic steel plates. On the other hand, there is a problem that the motor performance is degraded as a result of the promotion of the reduction in the size of the motor and the generation of extremely high heat by the motor for the size of the motor. In order to solve this problem, notch portions are provided in the outer circumference of the stator and a cool air or the like is caused to flow through the notch portions to cool the motor and limit the generation of heat. Besides, in order to achieve another objective to ensure a punching yield of electromagnetic steel plates and a gap in the layering direction for sticking means such as welding, notch portions are provided on the outer circumference side of the stator.

FIG. 7 is a perspective view showing an example of the stator of a conventional brushless DC motor having such notch portions. In FIG. 7, the same parts as in those of FIGS. 2 and 5 are designated with the same numbers.

A notch portion 109 running from the upper end to the lower end of the stator 101 is provided on the outer circumferential surface of the yoke 102, at a position near the outside of every third tooth 103. The notch portions 109 are provided on the outer circumference as the cooling paths for releasing heat during the operation of the motor and for the purpose of easing the welding that is performed for fixing plural layered steel plates (by using the protrusions in the notch portions 109) and easing the punching of material to improve the yield. By providing the notch portions 109 on the outer circumference, it is possible to prevent the welded section from fixing out of the outer circumference of the stator 101 in welding the thin electromagnetic thin plates to fix them integrally. Moreover, the notch portions 109 are often provided for the purpose of saving the material of the thin electromagnetic steel plates of the stator 101. As described above, each of the notch portions 109 runs from the upper end to the lower end of the stator 101 and has a length S0 in the layering direction.

In the above-described conventional stator 101, since the notch portions 109 are aligned with the layering direction, there is a difference in the magnetic resistance seen from the inside of the stator 101 between a region of the teeth 103 where the notch portion 109 is present on the outer circumference side of the stator 101 and a region where the notch portion 109 is not present. In the case where a rotor having permanent magnets is positioned inside the stator 101, a magnetic circuit in which the magnetic flux flows is formed between the stator 101 and the rotor which faces the teeth 103 and have permanent magnets arranged so that adjacent permanent magnetic have opposite polarities. This magnetic circuit is formed as a magnetic closed circuit composed mainly of the shortest path between adjacent opposite poles. The shortest magnetic circuit starting from a region between the magnetic poles of the permanent magnets of the rotor is most of the causes of generation of cogging torque. In this magnetic circuit, there is a big difference in the magnetic flux amount between a region of the teeth 103 where the notch portion 109 is present on the outer circumference side of the stator 101 and a region where the notch portion 109 is not present. Thus, the difference in the magnetic flux amount according to the positions in the rotary direction of the rotor is one of the causes of cogging torque, and is a cause of generation of sound and vibration.

FIG. 8 is a view showing the state of magnetic flux in such a brushless DC motor. Here, the rotor 105 having the permanent magnets 107 attached to the surface of the rotor core 106 is disposed inside the stator 101 shown in FIG. 7. The stator 101 is formed by layering necessary pieces of thin electromagnetic steel plates having a portion equivalent to the notch portion 109 on the outer circumference side of every third portion equivalent to the tooth 103. Note that the rotor 105 may be a buried-type rotor having permanent magnets buried in the rotor core 106.

A magnetic flux generated by the relative positional relationship between the stator 101 and the regions between the magnetic poles of the opposing permanent magnets 107 of the rotor 105 flows in respective portions of the stator 101. The magnetic flux amount in a magnetic path a in a region of the teeth 103 where a notch portion 109 is present on the outer circumference side of the stator 101 is denoted as $\phi 1$, the magnetic flux amount in a magnetic path b in a region of the teeth 103 where no notch portion 109 is present on the outer circumference side of the stator 101 is denoted as $\phi 2$, and the magnetic flux amount in a magnetic path c in a region where a notch portion 109 different from that for the flux amount $\phi 1$ is present is denoted as $\phi 3$. Here, if the notch portions 109 have the same configuration, it is clear that only the difference between the magnetic flux amounts $\phi 1$ and $\phi 3$ is the position of the notch portion 109 in the magnetic path, and the magnetic flux amounts $\phi 1$ and $\phi 3$ are the same in magnitude.

Here, as shown in FIG. 8, when straight lines A, B and C are drawn from the center of the shaft hole of the rotor 105 through the center of the slots 104 toward the outer circumference of the stator 101, if a region between the magnetic poles of the permanent magnets 107 of the rotor 105 is positioned on the straight line A, the magnetic flux from the permanent magnets 107 near the region between the magnetic poles forms a closed circuit of the magnetic flux amount $\phi 1$ by the magnetic path a shown by a dotted line. Besides, when the rotor 105 rotates clockwise and the region between the magnetic poles of the permanent magnets 107 reaches the straight line B, the magnetic flux from the permanent magnets 107 near the region between the magnetic poles forms a closed circuit of the flux amount $\phi 2$ by the magnetic path b shown by a dotted line. When the rotor 105 further rotates clockwise and the region between the magnetic poles of the permanent magnets 107 reaches the straight line C, the magnetic flux from the permanent magnets 107 near the region between the magnetic poles forms a closed circuit of the flux amount $\phi 3$ by the magnetic path c shown by a dotted line.

There is a difference in the cross sectional area of the magnetic path due to the presence and absence of the notch portion 109 in the magnetic path, between the state where the region between the magnetic poles of the permanent magnets 107 of the rotor 105 is positioned on the straight line A and the state where the region between the magnetic poles is positioned on the straight line B. Accordingly, there is a difference in the magnetic resistance, and the flux amounts are $\phi 1 < \phi 2$. Similarly, there is a difference in the cross sectional area of the magnetic path due to the presence and absence of the notch portion 109, between the state where the region between the magnetic poles of the permanent magnets 107 of the rotor 105 is positioned on the straight line B and the state where the region between the magnetic poles is positioned on the straight line C. Accordingly, there is a difference in the magnetic resistance, and the flux amounts are $\phi 3 < \phi 2$.

Hence, when the region between the magnetic poles of the permanent magnets 107 of the rotor 105 is positioned on the straight line B having no notch portion 109 on the outer circumference side of the stator 101, the strongest magnetic coupling is obtained between the rotor 105 and the stator 101. The change in cogging torque resulting from such phenomena is that the largest cogging torque appears when the region between the magnetic poles approaches or moves away from the position of the straight line B because the magnetic coupling is strong in that position as shown in FIG. 9 and described above. In FIG. 9, the vertical axis indicates the cogging torque TC and the horizontal axis shows the rotation angle $\theta$ of the rotor 105, and the positions of the straight lines A to C shown in FIG. 8 correspond to the positions of the straight lines A to C of FIG. 9.

However, in the brushless DC motor, since the notch portions 109 are provided on the outer circumference side of the stator 101, the size of the cross sectional area of the magnetic paths varies because of the difference in the magnetic paths as described above. As a result, the brushless DC motor suffers from a problem of deterioration of the pulsation of cogging torque.

BRIEF SUMMARY OF THE INVENTION

It is an object of the present invention to provide a brushless DC motor capable of effectively eliminating cogging torque.

It is another object of the present invention to provide a brushless DC motor capable of certainly reducing cogging torque without making almost no sacrifice to the output characteristics.

It is still another object of the present invention to provide a brushless DC motor having notch portions or cavity portions in its stator and capable of reducing the pulsation of cogging torque.

It is yet another object of the present invention to provide a method of manufacturing a brushless DC motor, capable of manufacturing a brushless DC motor of excellent quality.

A brushless DC motor according to the first aspect is a brushless DC motor comprising: a rotor having plural permanent magnets; and a stator having plural slots, wherein the rotor is divided into three rotor blocks in a rotation axis direction, and the three rotor blocks are layered so that arrangement angles of the rotor blocks differ from each other by an amount of a mechanical angle in a rotary direction that is equivalent to one third of a pulsation period of cogging torque generated by the rotor and stator. It is thus possible to realize a brushless DC motor capable of effectively eliminating cogging torque.

A brushless DC motor according to the second aspect is based on the first aspect, wherein a sum of an effective polar opening angle of one permanent magnet and a difference between the arrangement angles of the rotor block located on one end and the rotor block located on the other end is not more than a pole pitch angle of the rotor. Thus, each permanent magnet does not overlap adjacent different magnetic pole, and every magnetic flux from the permanent magnet becomes an effective magnetic pole. Therefore, in comparison with a rotor that uses skew magnets and a rotor that uses a ring magnet magnetized on the skew as anti-cogging measures which are usually performed in this type of motor, the amount of permanent magnets to be used can be decreased and the cogging torque can be reduced without deteriorating the electrical characteristics. Moreover, it is possible to perform built-in magnetization for magnetizing the rotor in a non-magnetic state by using the stator as a magnetic yoke after assembling the motor. Accordingly, it is possible to eliminate a difficult handling work caused by the rotor blocks being attracted to the stator, case, etc. and to prevent dust such as an iron powder attracted to the rotor blocks from being carried into the case, thereby realizing a brushless DC motor having good quality.

A brushless DC motor according to the third aspect is a brushless DC motor comprising: a rotor having plural permanent magnets; and a stator having plural slots, wherein each of the permanent magnets is divided into three permanent magnets in a rotation axis direction, and the three permanent magnets are layered so that arrangement angles of the permanent magnets differ from each other by an amount of a mechanical angle in a rotary direction that is equivalent to one third of a pulsation period of cogging torque generated by the rotor and stator. It is therefore possible to realize a brushless DC motor capable of effectively eliminating cogging torque. Moreover, since this is achieved only by the arrangement of the permanent magnets without dividing the rotor core itself, it is possible to realize a brushless DC motor that is easy to assemble.

A brushless DC motor according to the fourth aspect is based on the third aspect, wherein a sum of an effective polar opening angle of one of the permanent magnets and a difference between the arrangement angles of the permanent magnets located on both ends in the rotation axis direction among the three permanent magnets is not more than a pole pitch angle of the rotor. Accordingly, each permanent magnet does not overlap adjacent different magnetic pole, and every magnetic flux from the permanent magnets becomes an effective magnetic pole. Therefore, in comparison with a rotor that uses skew magnets and a rotor that uses a ring magnet magnetized on the skew as anti-cogging measures which are usually performed in this type of motor, the amount of permanent magnets to be used can be decreased and the cogging torque can be reduced without deteriorating the electrical characteristics. Moreover, since this is achieved only by the arrangement of the permanent magnets without dividing the rotor core itself, it is possible to realize a brushless DC motor that is easy to assemble.

A brushless DC motor according to the fifth aspect is a brushless DC motor comprising: a rotor having plural magnetic poles provided at an equal pitch in a circumferential direction by mounting permanent magnets in magnet mounting holes; and a stator having plural slots arranged at an equal pitch in a circumferential direction, wherein the magnetic poles of the rotor include magnetic poles whose magnet deviation angle formed by a central line of an effective polar opening angle and a central line of the magnet mounting hole is a first angle; and magnetic poles whose magnet deviation angle is a second angle. Of course, the first angle and the second angle are different angles. In this brushless DC motor, the magnetic poles of the rotor include magnetic poles whose magnet deviation angle is the first angle (hereinafter referred to as the "magnetic poles of the first angle") and magnetic poles whose magnet deviation angle is the second angle (hereinafter referred to as the "magnetic poles of the second angle"). Therefore, the phase of cogging torque generated by the magnetic pole of the first angle and the phase of cogging generated by the magnetic pole of the second angle do not coincide with each other. In other words, these cogging torques do not reach the peaks simultaneously because of the following reason. In these magnetic poles, there is a difference in the timing in which an end of the magnet crosses an end of the slot of the stator by rotation. For this reason, the overall cogging torque of the brushless DC motor is reduced as compared to a construction where all the magnetic poles have an equal magnet deviation angle.

A brushless DC motor according to the sixth aspect is based on the fifth aspect, wherein a difference $\theta 6$ between the second angle and the first angle is within a range defined by $0.2 \times \theta 7 \leq \theta 6 \leq \theta 5 - (0.2 \times \theta 7)$, where $\theta 5$ is a slot pitch angle of the stator, and $\theta 7$ is a slot opening angle of the stator. In this case, if the magnetic pole of the first angle is set as a standard, then, in the magnetic pole of the second angle, the permanent magnet is mounted at a position preceding (or succeeding) by an amount of the angle $\theta 6$ in the rotary direction. Here, if the first angle is zero, then the second angle is $\theta 6$. In this case, in the magnetic pole of the first angle, the central line of the effective polar opening angle and the central line of the magnet mounting hole coincide with each other. On the other hand, in the magnetic pole of the second angle, the central line of the effective polar opening angle deviates from the central line of the magnet mounting hole by an amount of $\theta 6$. Hence, there is a corresponding difference in the timing in which the cogging torque reaches the peak between these magnetic poles. If this difference is too small, the effect of reducing the overall cogging torque of the brushless DC motor is not sufficient. On the other hand, if the difference is too large, the timings in which the cogging torques reach the peaks become close to each other because of the relationship with adjacent slot of the stator. More specifically, when the magnet deviation angle is as large as the slot pitch angle $\theta 5$ of the stator, such a result is given. When the difference between the first angle and the second angle is within the above-mentioned range, such a result is not given and the overall cogging torque of the brushless DC motor is certainly restricted.

A brushless DC motor according to the seventh aspect is based on the fifth or sixth aspect, wherein the number of the magnetic poles of the first angle and the number of the magnetic poles of the second angle are equal to each other on the rotor. It is therefore possible to more certainly restrict the overall cogging torque by the mutual cancellation of the cogging torque waveforms of the magnetic poles of the first angle and the magnetic poles of the second angle.

A brushless DC motor according to the eighth aspect is based on any one of the fifth through seventh aspects, wherein the magnetic pole of the first angle and the magnetic pole of the second angle are arranged next to each other on the rotor. Since the rotor is a rotary member, the rotary balance must be taken into consideration. Changing the magnet deviation angle by the magnetic poles may shift the center of gravity of the rotor from the center of the axis and deteriorate the rotary balance. However, it is possible to minimize the deterioration of the rotary balance by arranging the magnetic pole of the first angle and the magnetic pole of the second angle next to each other.

A brushless DC motor according to the ninth aspect is based on any one of the fifth through seventh aspects, wherein the rotor is divided into plural bocks in a rotation axis direction, and the magnetic pole of the first angle and the magnetic pole of the second angle are arranged at corresponding positions in the rotation axis direction in different blocks. The corresponding positions in the rotation axis direction mean the positions having the same angular coordinates about the axis. Accordingly, in the rotor as a whole, the cancellation of the cogging torque waveforms is achieved within a single magnetic pole. It is therefore possible to obtain such an effect that as if the cogging torque generated by a single magnetic pole is reduced. Consequently, the overall cogging torque of the brushless DC motor is effectively restricted.

A brushless DC motor according to the tenth aspect is based on the sixth aspect, wherein the rotor further includes magnetic poles whose magnet deviation angle is a third angle (hereinafter referred to as the "magnetic poles of the third angle"), a difference θ6 between the second angle and the first angle is within the range defined by the above expression, and a difference between the third angle and the first angle has the same value as and opposite sign to θ6, i.e., −θ6. In this case, if the magnetic pole of the first angle is set as a standard, then, in the magnetic pole of the second angle, the permanent magnet is mounted at a position preceding only by an amount of the angle θ6 in the rotary direction. In the magnetic pole of the third angle, the permanent magnet is mounted at a position succeeding only by an amount of the angle θ6 in the rotary direction. It is also possible to switch the preceding and succeeding relation. Accordingly, the cancellation of cogging torques is performed by three waveforms mutually shifted at equal intervals. Therefore, the overall cogging torque of the brushless DC motor can be more certainly restricted.

A brushless DC motor according to the eleventh aspect is based on the tenth aspect, wherein the number of the magnetic poles of the first angle, the number of the magnetic poles of the second angle and the number of the magnetic poles of the third angle are equal to each other. Therefore, the overall cogging torque of the brushless DC motor can be more certainly restricted by the cancellation of the cogging torque waveforms among the magnetic poles of the first angle, the magnetic poles of the second angle and the magnetic poles of the third angle.

A brushless DC motor according to the twelfth aspect is based on the eleventh aspect, wherein a total number of the magnetic poles of the rotor is an integral multiple of 6, and all of the magnetic poles of the rotor are any magnetic pole among the magnetic poles of the first angle, the magnetic poles of the second angle and the magnetic poles of the third angle. In this construction, since there is no extra waveform components, it is possible to more certainly restrict the cogging torque. Note that, in a construction where the rotor is divided into plural blocks in the axial direction, the total number of magnetic poles is the product of the number of blocks and the number of magnetic poles in each block.

A brushless DC motor according to the thirteenth aspect is a brushless DC motor comprising: a rotor having plural magnetic poles provided at an equal pitch in a circumferential direction by mounting permanent magnets in magnet mounting holes; and a stator having plural slots arranged at an equal pitch in a circumferential direction, wherein the rotor comprises convex portions corresponding to the magnetic poles on its circumference, and the magnetic poles of the rotor include magnetic poles whose convex portion deviation angle formed by a central line of the convex portion and a central line of the magnet mounting hole is a first angle; and magnetic poles whose convex portion deviation angle is a second angle. In this brushless DC motor, the magnetic poles of the rotor include the magnetic poles whose convex portion deviation angle is the first angle and the magnetic poles whose convex portion deviation angle is the second angle. The phases of cogging torques generated by these magnetic poles do not coincide with each other. More specifically, these cogging torques do not reach the peaks simultaneously because of the following reason. In these magnetic poles, there is a difference in the timing in which an end of the convex portion crosses an end of the slot of the stator by rotation. Thus, the overall cogging torque of the brushless DC motor is reduced as compared to a construction where all the magnetic poles have an equal convex portion deviation angle. Moreover, since the convex portions of the rotor is very light, they have almost no influence on the position of the center of gravity of the rotor.

A brushless DC motor according to the fourteenth aspect is a brushless DC motor comprising: a rotor having plural magnetic poles provided at an equal pitch in a circumferential direction by mounting permanent magnets in magnet mounting holes; and a stator having plural slots arranged at an equal pitch in a circumferential direction, wherein the rotor comprises convex portions corresponding to the magnetic poles on its circumference, and the magnetic poles of the rotor include magnetic poles whose magnet deviation angle and convex portion deviation angle are both first angle; and magnetic poles whose magnet deviation angle and convex portion deviation angle are both second angle. In this brushless DC motor, in the magnetic pole where the magnet deviation angle and convex portion deviation angle are both first angle, the central line of the effective polar opening angle and the central line of the convex portion coincide with each other. Similarly, they coincide with each other in the magnetic pole where the magnet deviation angle and convex portion deviation angle are both second angle. Therefore, the magnetic force is efficiently utilized. Of course, the cogging torque reducing effect by the difference in the magnet deviation angle and convex portion deviation angle between the magnetic poles is also obtained.

A brushless DC motor according to the fifteenth aspect is a brushless DC motor comprising notch portions or cavity portions provided near an outer circumference side of a part of teeth of a stator constructed by layering plural steel plates, wherein the steel plates are layered while displacing the steel plates at a predetermined angle in a circumferential direction so that a length of the notch portions or the cavity portions in a layering direction of each of the teeth of the layered steel plates is substantially equal. In this brushless DC motor, notch portions or cavity portions are provided near the outer circumference side of a part of the teeth of the stator constructed by layering plural steel plates, and the steel plates are layered while displacing the steel plates at a predetermined angle in a circumferential direction so that a length of the notch portions or the cavity portions in the layering direction of each tooth is substantially equal. Accordingly, since the difference in the size of the cross sectional area of the magnetic paths due to the notch portions or cavity portions can be made smaller, it is possible to realize a brushless DC motor comprising a stator having notch portions or cavity portions and capable of reducing the pulsation of cogging torque.

A brushless DC motor according to the sixteenth aspect is based on the fifteenth aspect, wherein a substantially equal number of the steel plates are layered at an equal angle to form blocks, and the steel plates are layered while displacing the blocks at a predetermined angle in a circumferential direction. In this brushless DC motor, the stator can be formed by layering blocks having aligned notch portions or cavity portions, thereby realizing a brushless DC motor comprising a stator having notch portions or cavity portions and capable of reducing the pulsation of cogging torque.

A brushless DC motor according to the seventeenth aspect is based on the fifteenth or sixteenth aspect, wherein the notch portions or cavity portions are formed in the steel plates for every other tooth. In this brushless DC motor, the difference in the size of the cross sectional area of the magnetic paths due to the notch portions or cavity portions can be made smaller and equalized, thereby realizing a brushless DC motor comprising a stator having an appropriate number of notch portions and cavity portions and capable of reducing the pulsation of cogging torque.

A brushless DC motor according to the eighteenth aspect is based on any one of the fifteenth through seventeenth aspects, wherein the notch portions or cavity portions are arranged so that adjacent notch portions or cavity portions of the angularly displaced steel plates in a cross sectional view in the layering direction are in point contact with or separated from each other. In this brushless DC motor, the difference in the size of the cross sectional area of the magnetic paths due to the notch portions or cavity portions can be made smaller and equalized, thereby realizing a brushless DC motor comprising a stator having notch portions or cavity portions with less magnetic flux leakage and capable of reducing the pulsation of cogging torque.

A method of manufacturing a brushless DC motor according to the nineteenth aspect is a method of manufacturing a brushless DC motor of any one of the first through fourth aspects, wherein the permanent magnets of the rotor are produced by magnetizing the rotor blocks or rotor by using the stator as a magnetic yoke after assembling the motor. Accordingly, it is possible to eliminate a difficult handling work caused by the permanent magnets being attracted to the stator, case, etc. and prevent dust such as an iron powder attracted to permanent magnets from being carried into the case, thereby enabling the manufacturing of a brushless DC motor having good quality.

The above and further objects and features of the invention will more fully be apparent from the following detailed description with accompanying drawings.

BRIEF DESCRIPTION OF THE SEVERAL VIEWS OF THE DRAWINGS

FIGS. 14A, 14B and 14C are views showing the construction of the rotor of a brushless DC motor according to the second embodiment of the present invention;

DETAILED DESCRIPTION OF THE INVENTION

The following description will explain the present invention with reference to the drawings illustrating some embodiments thereof.

First Embodiment

Figure 1:
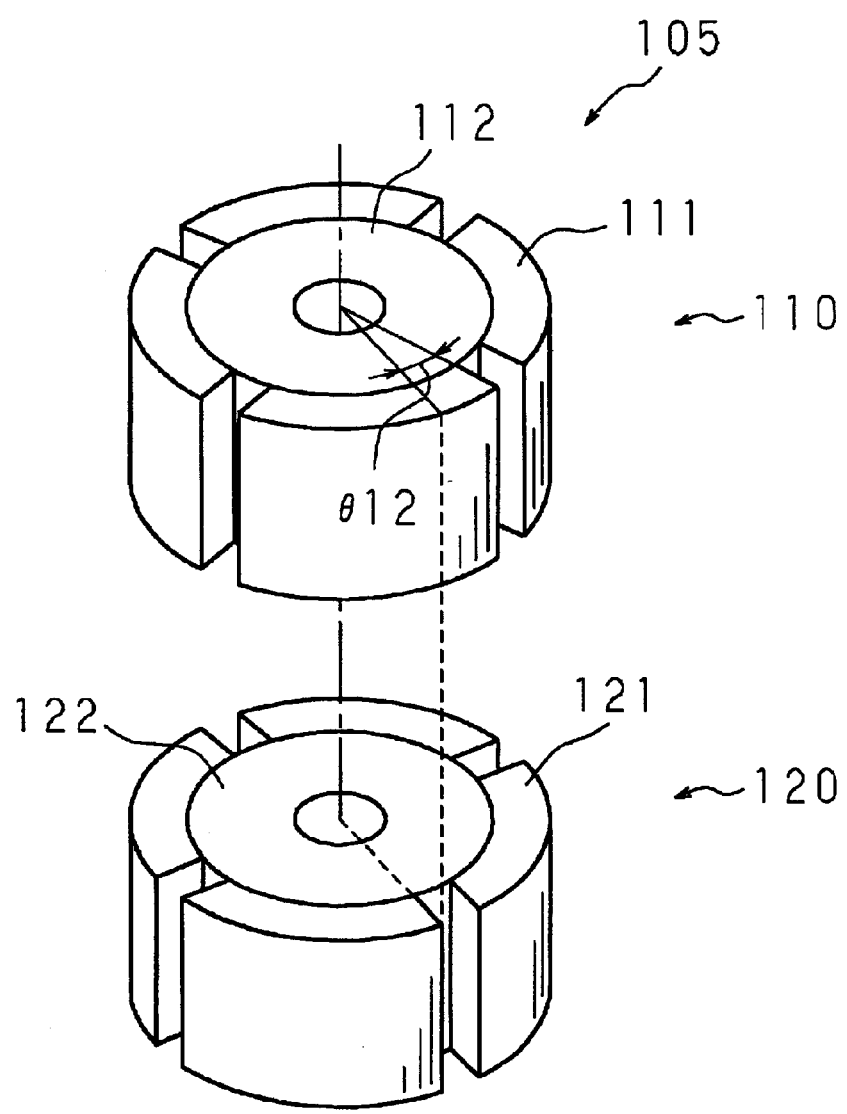
FIG. 1 is a view showing one example of anti-cogging torque measure taken by a conventional brushless DC motor.
Figure 2:
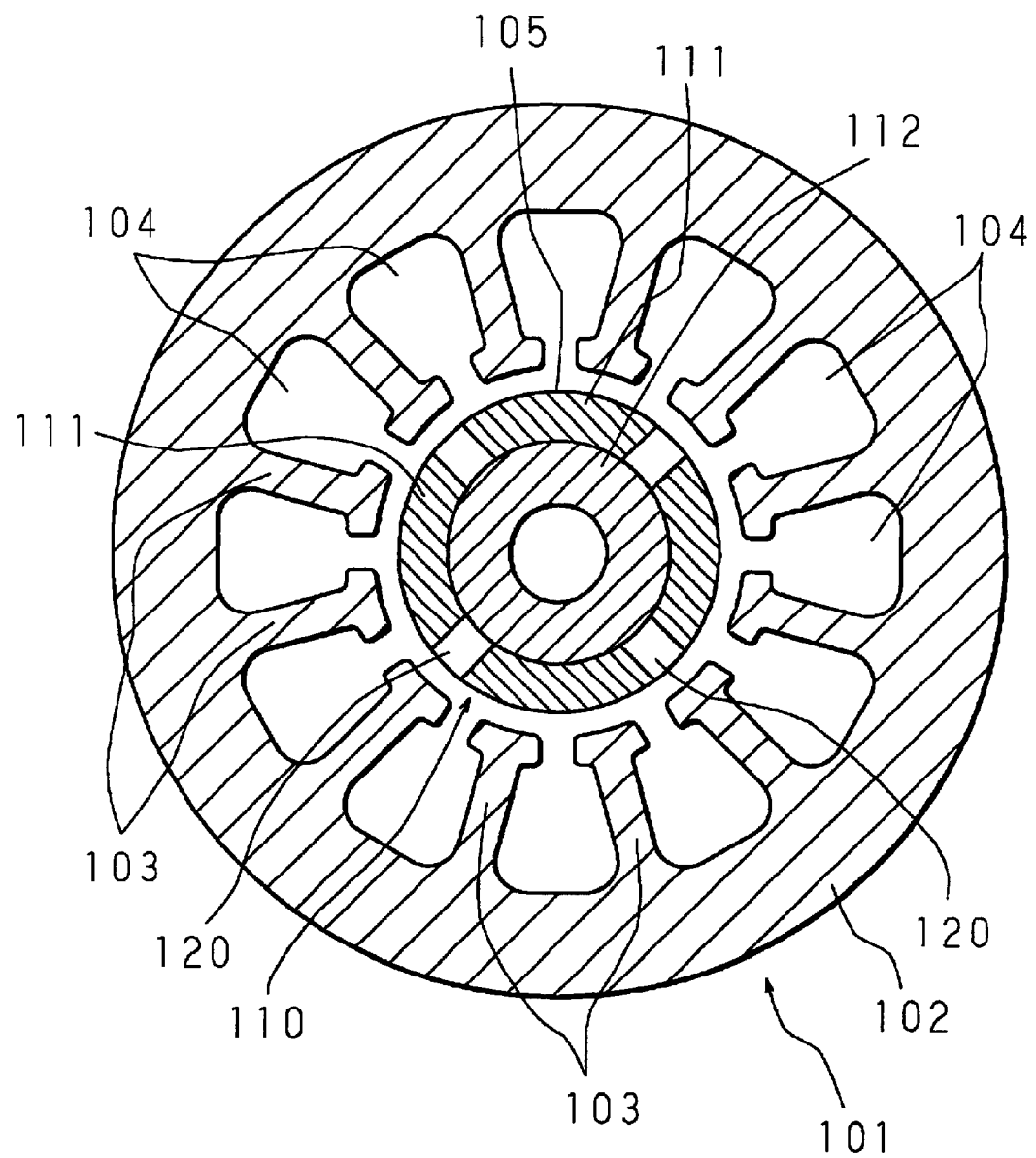
FIG. 2 is a view showing the relationship between the conventional rotor blocks and the stator.
Figure 3A:
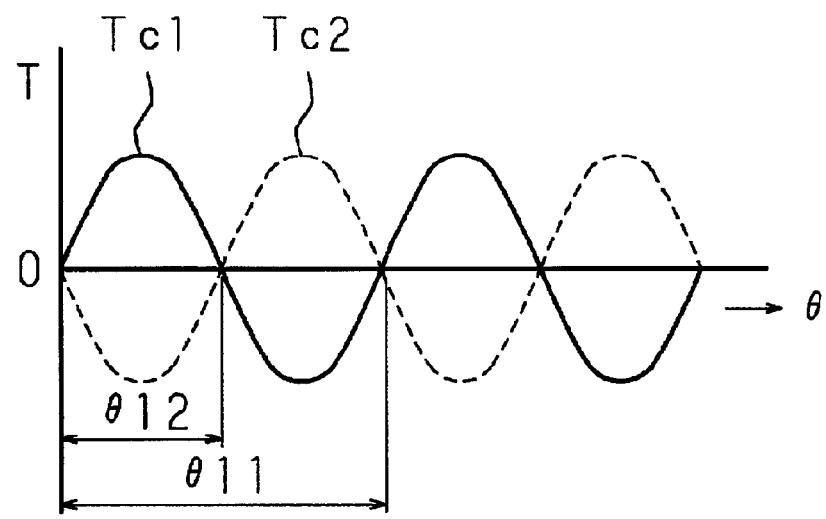
FIGS. 3A and 3B are waveform charts for explaining the conventional anti-cogging torque measure.
Figure 3B:
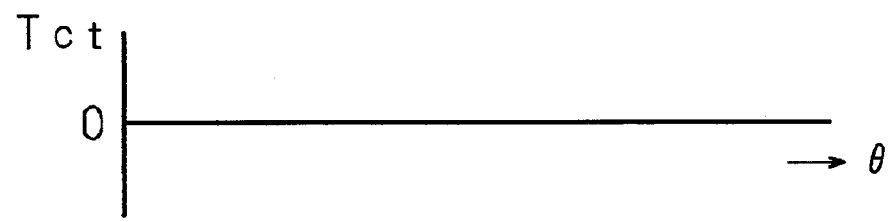
Figure 4A:
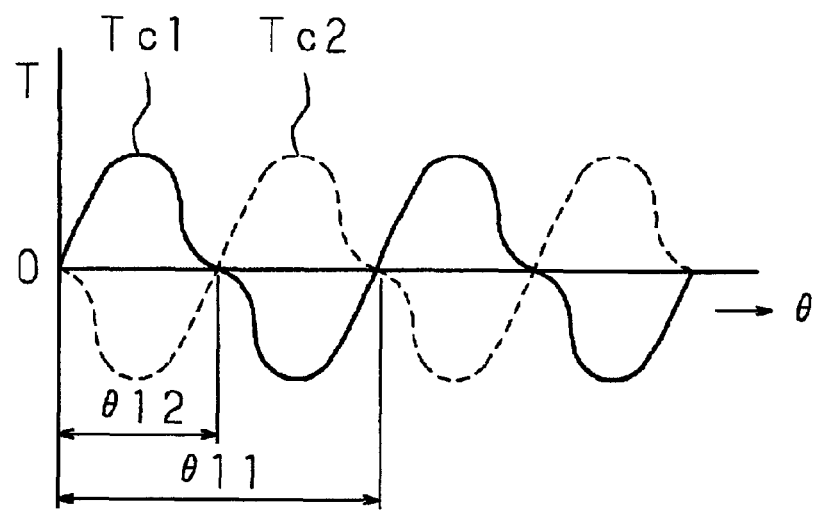
FIGS. 4A and 4B are waveform charts for explaining the influence of the conventional anti-cogging torque measure.
Figure 4B:
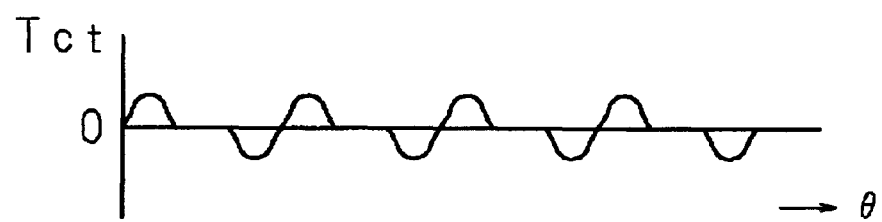
Figure 5:
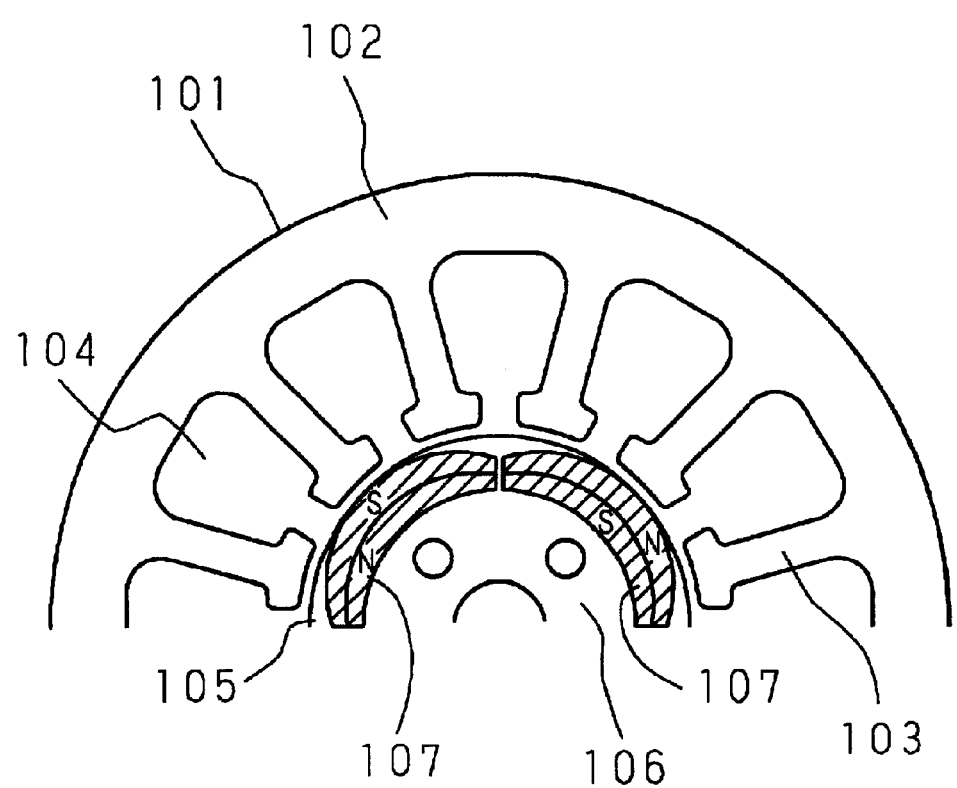
FIG. 5 is a view showing another example of anti-cogging torque measure taken by the conventional brushless DC motor.
Figure 6:
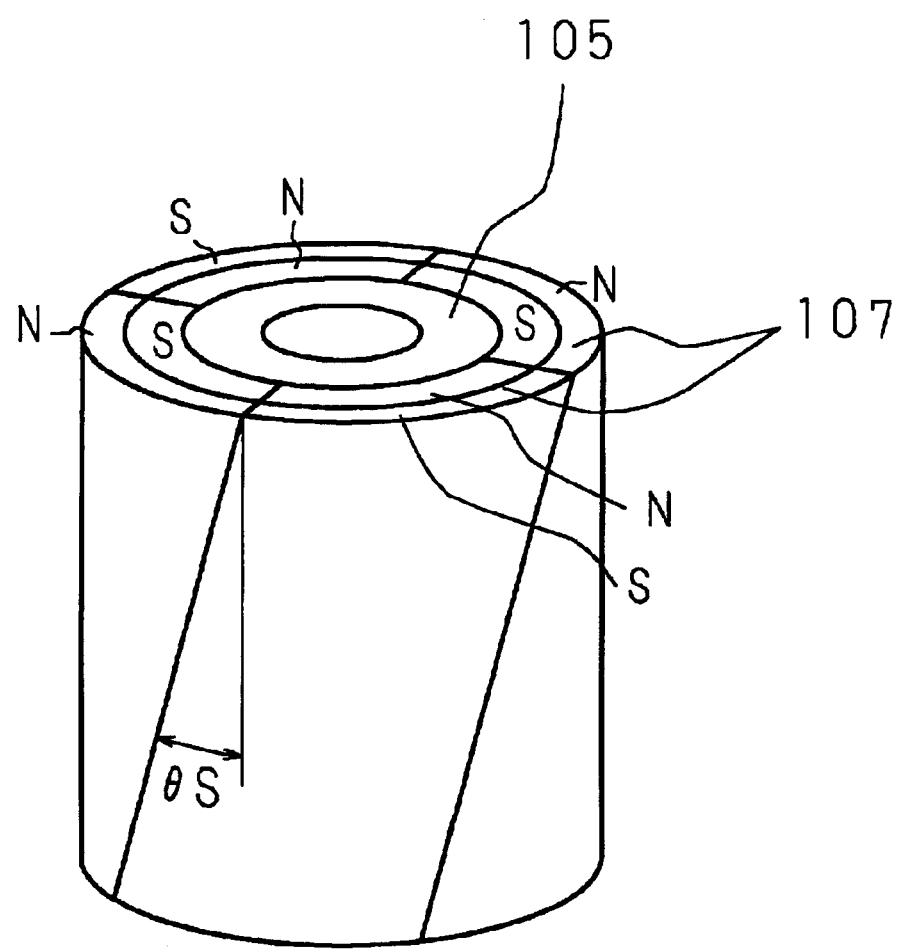
FIG. 6 is a view showing still another example of anti-cogging torque measure taken by the conventional brushless DC motor.
Figure 7:
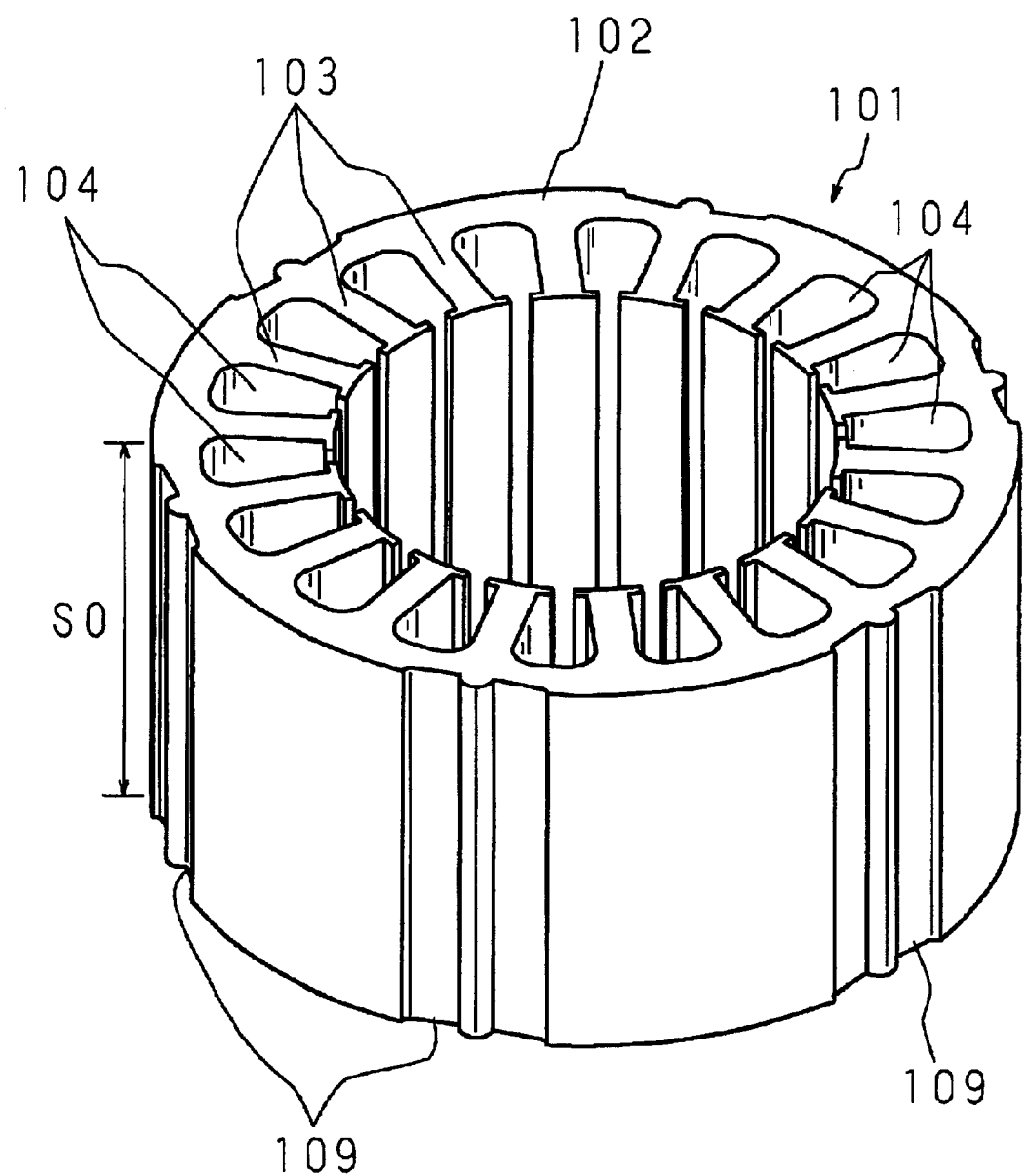
FIG. 7 is a perspective view showing an example of the stator of the conventional brushless DC motor.
Figure 8:
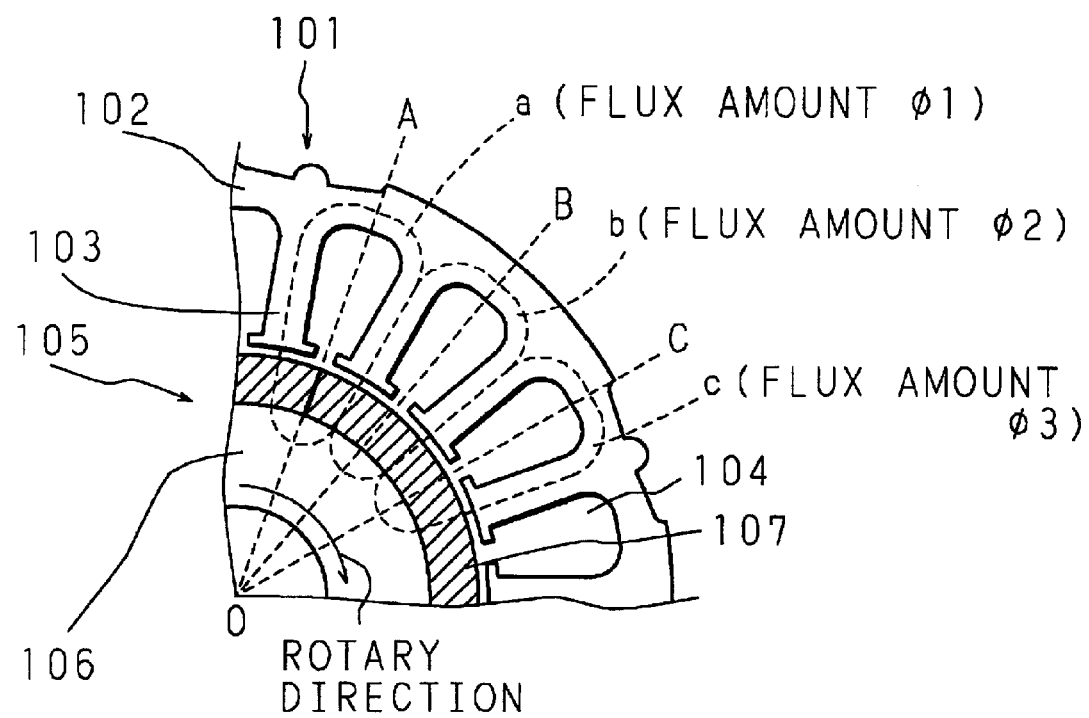
FIG. 8 is a view for explaining the state of magnetic flux in the conventional brushless DC motor.
Figure 9:
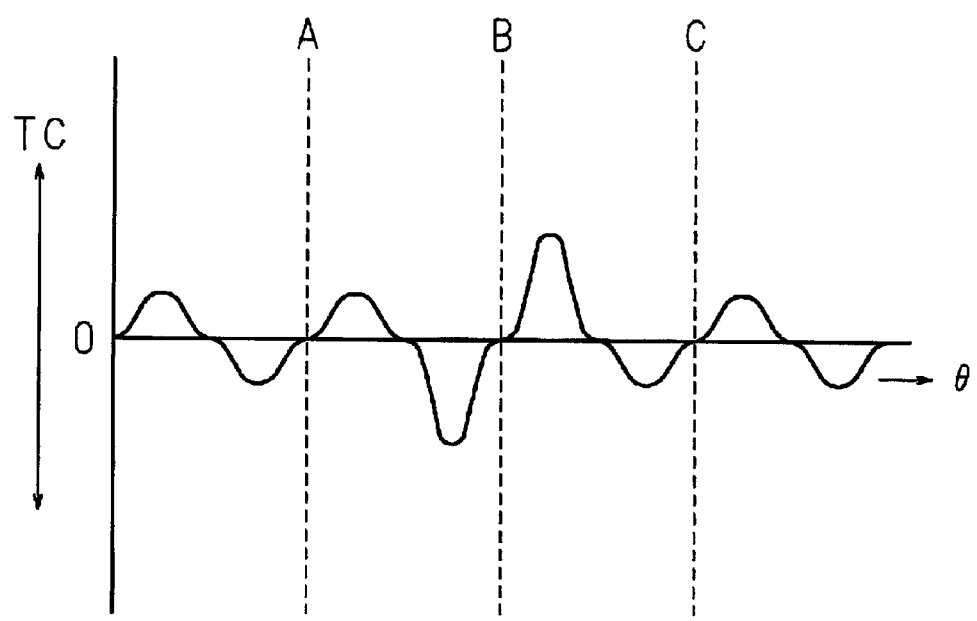
FIG. 9 is a waveform chart showing the change of cogging torque of the conventional brushless DC motor.
Figure 10:
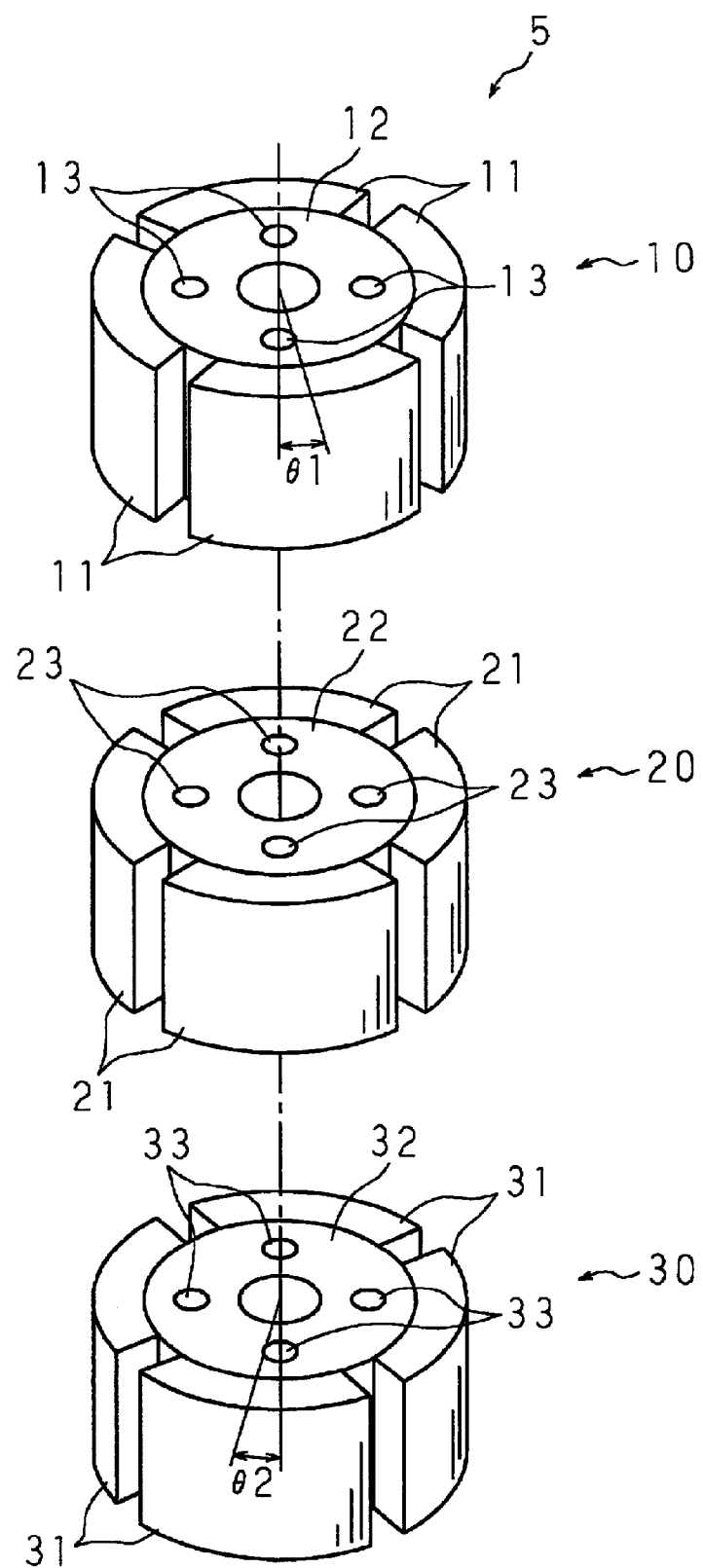
FIG. 10 is a perspective view showing the construction of the rotor of a brushless DC motor according to the first embodiment of the present invention.

FIG. 10 is a perspective view showing the construction of a rotor of a brushless DC motor according to the first embodiment of the present invention. This rotor 5 is constructed by a rotor block 10 in the upper stage, a rotor block 20 in the middle stage, and a rotor block 30 in the lower stage. The rotor block 10 comprises an internal rotor core 12, and four permanent magnets 11 attached to the outer circumference of the rotor core 12 at equal intervals. The rotor block 20 comprises an internal rotor core 22, and four permanent magnets 21 attached to the outer circumference of the rotor core 22 at equal intervals. The rotor block 30 comprises an internal rotor core 32, and four permanent magnets 31 attached to the outer circumference of the rotor core 32 at equal intervals.

The rotor cores 12, 22 and 32 have the same size, and each of which comprises four coupling member insertion holes 13, 23, 33 for fixing the rotor blocks 10, 20 and 30 integrally with coupling members. The permanent magnets 11, 21 and 31 have the same size. Note that the permanent magnets 11, 21 and 31 are stuck to the rotor cores 11, 21 and 31, respectively, with an adhesive or the like. Alternatively, although it is not shown in the drawing, a protective cover or the like is fixed to the outer circumference of each of the permanent magnets 11, 21 and 31 by shrinkage fitting, press fitting or other method. In this case, the material of the protective cover is suitably selected according to the condition of use of a non-magnetic material or a magnetic material.

The upper-stage rotor block 10 and the middle-stage rotor block 20 are layered in the axial direction so that they are mutually displaced at angle $\theta 1$ in the circumferential direction. The middle-stage rotor block 20 and the lower-stage rotor block 30 are layered in the axial direction so that they are mutually displaced at angle $\theta 2$ in the opposite direction to the upper-stage rotor block 10 and the middle-stage rotor block 20. Thus, the displacement angle between the upper-stage rotor block 10 and the lower-stage rotor block 30 is the sum of the angle $\theta 1$ and the angle $\theta 2$, and the rotor blocks 10, 20 and 30 are layered while sequentially displacing them in one direction by rotation. The mutual displacement angles $\theta 1$ and $\theta 2$ of the rotor blocks 10, 20 and 30 are corresponding to an electrical angle of 120° of a pulsation period of cogging torque (one third of the pulsation period) generated in the rotor which is not divided.

Figure 11:
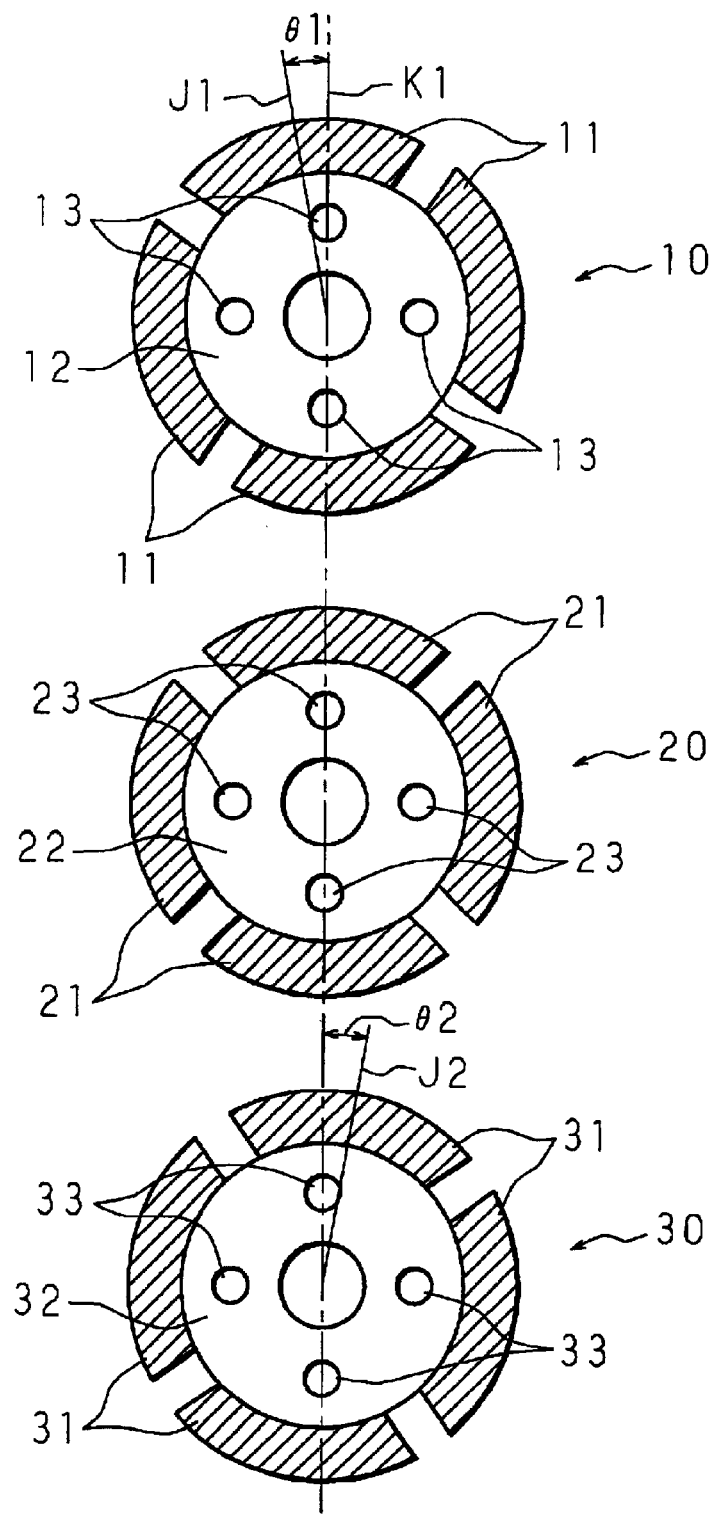
FIG. 11 is a view showing the displaced state of the rotor blocks.

FIG. 11 is a view showing the displaced state of each of the rotor blocks 10, 20 and 30 by the plan views of the respective rotor blocks 10, 20 and 30. The same parts as in FIG. 10 are designated with the same numbers. A common central straight line K1 is drawn through the rotor blocks 10, 20 and 30 to show the displacement angles of the respective blocks. The rotor block 10 is displaced by counterclockwise rotation only at the angle $\theta 1$ formed by the common central straight line K1 and a central line J1 of the permanent magnet 11 located on the common central straight line K1.

The rotor block 30 is displaced by clockwise rotation only at the angle $\theta 2$ formed by the common central straight line K1 and a central line J2 of the permanent magnet 31 located on the common central straight line K1. The rotor block 20 is not displaced, and the central line of the permanent magnet 21 located on the common central straight line K1 is positioned on the common central straight line K1.

These rotor blocks 10, 20 and 30 are aligned with the common central line K1 and stuck integrally by inserting caulking pines or bolts, for example, into the coupling member insertion holes 13, 23 and 33. As a result, the rotor blocks 10, 20 and 30 are layered so that the magnetic pole center positions of the permanent magnets 11, 21 and 31 are displaced sequentially in the circumferential direction and the positions of the regions between the magnetic poles of the permanent magnets 11, 21 and 31 are relatively displaced by the same angle, thereby constructing the rotor.

If such a rotor rotates in the counterclockwise direction, the pulsation of cogging torque caused by each of the rotor blocks 10, 20 and 30 is such that the pulsation of cogging torque of the rotor block 10 advances the phase at an electrical angle equivalent to mechanical angle $\theta 1$ with respect to the rotor block 20, while the pulsation of cogging torque of the rotor block 30 delays the phase at an electrical angle equivalent to mechanical angle $\theta 2$ with respect to the rotor block 20.

If the pulsation of cogging torque of each of the rotor blocks 10, 20 and 30 is a sinusoidal wave and the mutual displacement angle of the rotor blocks 10, 20 and 30 is corresponding to an electrical angle of 120° of a pulsation period of cogging torque (one third of the pulsation period) generated in the rotor which is not divided, then the pulsations of cogging torques of the rotor blocks 10, 20 and 30 are combined in the same manner as three-phase sinusoidal alternating currents, and cancelled out.

Figure 12A:
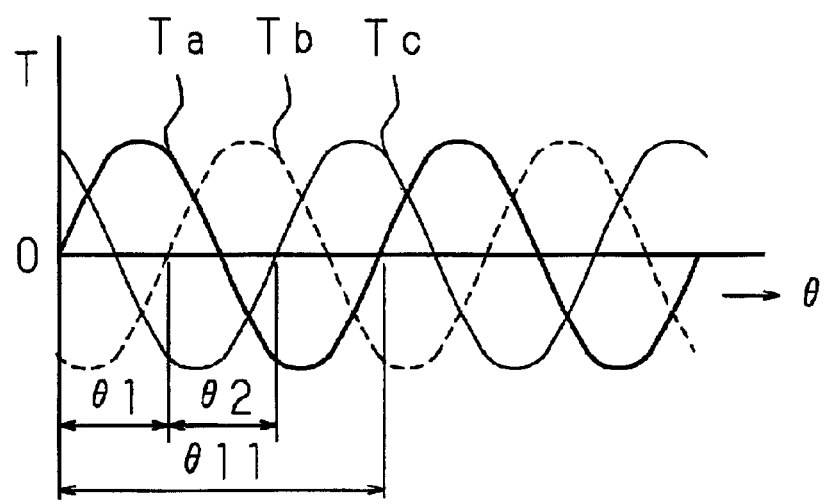
FIG. 12A is a waveform chart of cogging torques of three rotor blocks.
Figure 12B:
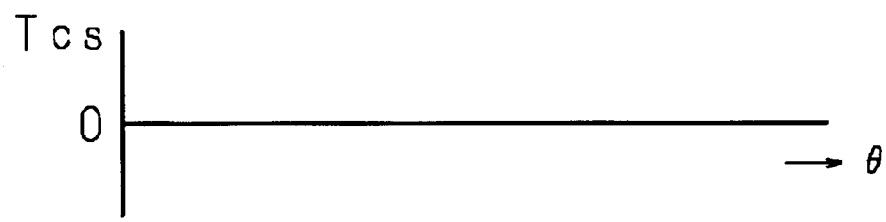
FIG. 12B is a waveform chart of the composite cogging torque of FIG. 12A.

FIG. 12A is a waveform chart of cogging torque of each of the rotor blocks 10, 20 and 30 in this case and shows the waveforms of cogging torque Ta in the rotor block 10, cogging torque Tb in the rotor block 20 and cogging torque Tc in the rotor block 30. In FIG. 12A, $\theta 1$ indicates a leading phase angle obtained by advancing the waveform of the cogging torque Tb at an electrical angle equivalent to the mechanical angle $\theta 1$ shown in FIG. 11, while $\theta 2$ indicates a lagging phase angle obtained by delaying the waveform of the cogging torque Tb at an electrical angle equivalent to the mechanical angle $\theta 1$ shown in FIG. 11 (they are designated with the same codes in FIG. 12A for the purpose of facilitating the comparison with FIG. 11). In addition, $\theta 11$ represents the pulsation period of the cogging torque waveform. FIG. 12B indicates the composite cogging torque Tcs thereof, and, as explained in above, pulsation does not appear in the composite cogging torque Tcs resulting from combining the three-phase sinusoidal waves of the cogging torques Ta, Tb and Tc.

Figure 13A:
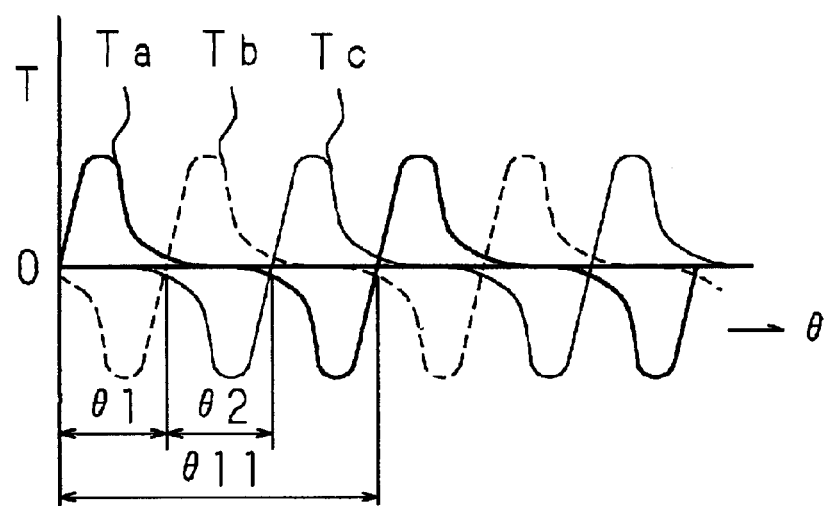
FIG. 13A is a waveform chart of cogging torques when the cogging torques of the rotor blocks are being distorted.
Figure 13B:
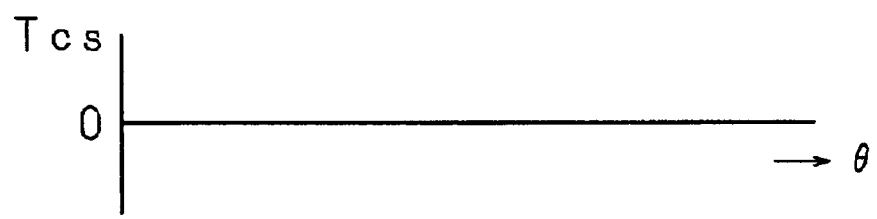
FIG. 13B is a waveform chart of the composite cogging torque of FIG. 13A.

FIG. 13A is a waveform chart of each cogging torque when distortion is present in the cogging torques of the rotor blocks 10, 20 and 30. FIG. 13B indicates the composite cogging torque Tcs thereof. In the case where the cogging torques of the rotor blocks 10, 20 and 30 include even higher harmonics as explained in the conventional example, if the composite cogging torque Tcs is shown by an expression similar to expression (1), it is given by the following expression (2), where x is an electrical angle representing the angle of an arbitrary rotational position of the rotor and n is a natural number. According to this expression (2), not only the fundamental wave components of cogging torques, but also the even harmonics components thereof cancel each other out, so that pulsation of cogging torque will not appear theoretically as shown in FIG. 13B.

$$Tcs = TO/3 \{ \sin(x) + \sum_{n=1}^{\infty} [kn \cdot \sin(2nx)] + \sin(x + 2\pi/3) + \qquad (2)$$

$$\sum_{n=1}^{\infty} [kn \cdot \sin(2nx + 2n \cdot 2\pi/3)] +$$

$$\sin(x + 4\pi/3) + \sum_{n=1}^{\infty} [kn \cdot \sin(2nx + 2n \cdot 4\pi/3)] \}$$

$$= 0$$

Second Embodiment

Figure 14A:
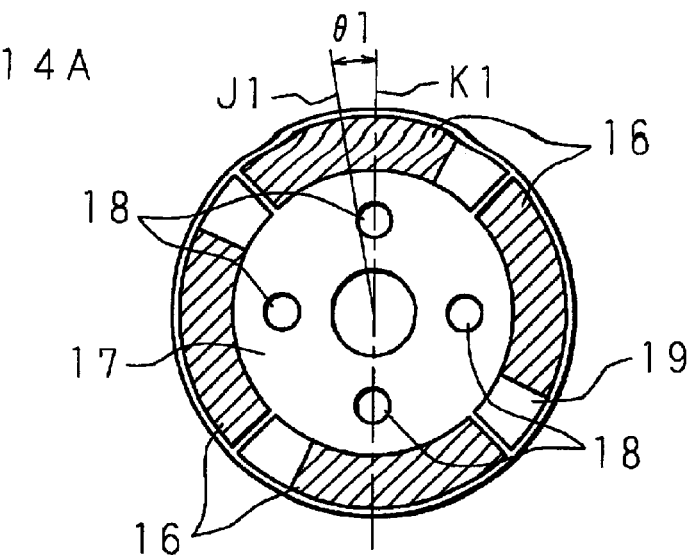
Figure 14A:
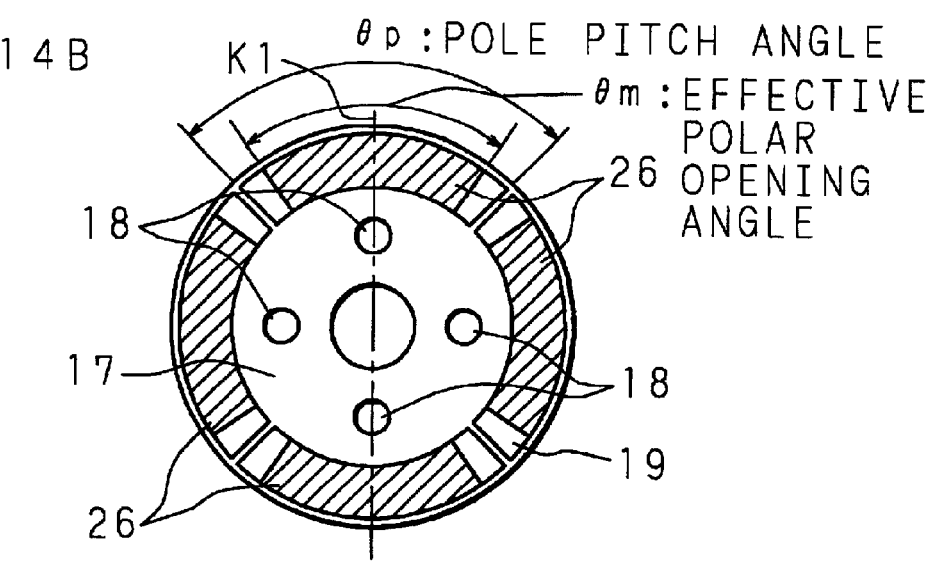
Figure 14C:
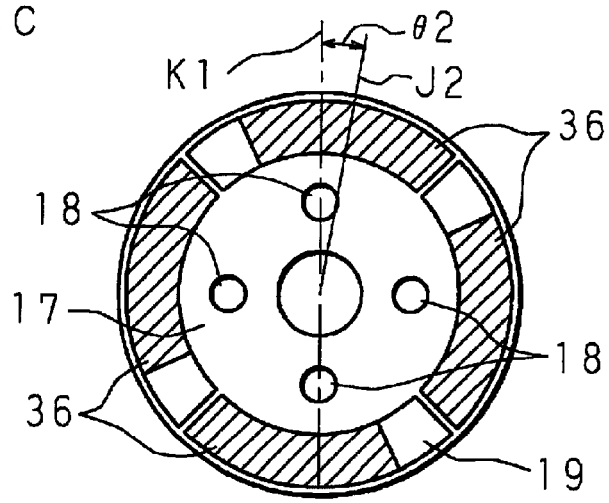

FIGS. 14A, 14B and 14C show the construction of a rotor of a brushless DC motor according to the second embodiment of the present invention by a plan view (FIG. 14A) and cross sectional views (FIGS. 14B and 14C) in a direction perpendicular to the rotary shaft. This rotor is a permanent magnet-buried type rotor constructed by inserting permanent magnets into empty holes formed in a rotor core, and comprises a rotor core 17 and four sets of permanent magnets fitted at equal intervals into four empty holes 19 formed in the outer circumferential portion of the rotor core 17 at equal intervals along the outer circumference.

Each of the four sets of permanent magnets is composed of three permanent magnets 16, 26 and 36 located in the upper, middle and lower stages, the upper stage being one end in the direction of the rotary shaft. The permanent magnets 16, 26 and 36 have the same size. The rotor core 17 is formed by layering a number of thin electromagnetic steel plates and fixing them integrally, and provided with four coupling member insertion holes 18 for fixing them integrally with coupling members.

In FIGS. 14A, 14B and 14C, a common central straight line K1 is drawn through the permanent magnets 16, 26 and 36 to show the displacement angle of the respective magnets. The upper-stage permanent magnet 16 is displaced by counterclockwise rotation only at an angle θ1 formed by a central line J1 of the permanent magnet 16 and the common central straight line K1. The lower-stage permanent magnet 36 is displaced by clockwise rotation only at an angle θ2 formed by a central line J2 of the permanent magnet 36 and the common central straight line K1. The middle-stage permanent magnet 26 is not displaced, and the central line of the permanent magnet 26 coincides with the common central straight line K1. The mutual displacement angles θ1, θ2 of the permanent magnets 16, 26 and 36 are corresponding to an electrical angle of 120° of a pulsation period of cogging torque (one third of the pulsation period) generated when the permanent magnets 16, 26 and 36 are not displaced.

Here, the effective polar opening angle of the permanent magnets 16, 26 and 36 is denoted as θm and the pole pitch angle of the permanent magnets 16, 26 and 36 is denoted as θp. In order to effectively utilize the present invention, if the respective values are set so as to satisfy the relationship of the following expression (3), then at least the effective polar opening angle θm of the rotor obtained by layering the permanent magnets 16, 26 and 36 at predetermined displacement angles according to the point of the present invention will not exceed the pole pitch angle θp of the permanent magnets 16, 26 and 36. Therefore, every magnetic flux of the permanent magnets 16, 26 and 36 used in the rotor is utilized as the effective magnetic flux.

θp ≧ θm+θ1+θ2+ . . .  (3)

Moreover, as explained in the first embodiment, if the effective magnetic polar opening angle θm of the rotor obtained by constructing the rotor blocks according to the point of the present invention is set so as not to exceed at least the pole pitch angle θp of the permanent magnets, then the pole pitch angle θp of the rotor includes the effective polar opening angle θm of the permanent magnets positioned in the individual rotor blocks and θ1+θ2 that is the sum of the displacement angles of the rotor blocks. Thus, there is no need to displace the rotor cores in the circumferential direction. Accordingly, by only displacing the positions of the permanent magnets divided into three blocks in the rotation axis direction, in the circumferential direction at a mechanical angle equivalent to one third of a pulsation period caused by cogging of the rotor which is not divided, it is possible to obtain the same effects as the construction where the three divided rotor blocks are layered while mutually displacing them.

In a type of a rotor shown in FIG. 11 in which permanent magnets are arranged on the outer circumferential surface of a rotor yoke (rotor core), a central angle corresponding to the outer circumferential portion of the effective magnetic pole and a central angle corresponding to the outer circumferential portion of the permanent magnet are equal to each other. On the other hand, a permanent magnet-buried type rotor as shown in FIGS. 14A, 14B and 14C does not especially aim to have a structure for converging the magnetic flux. However, if the proportion of the magnetic material portion of the rotor core located between the permanent magnets and the outer circumference of the rotor is large, the magnetic flux of the permanent magnet tends to diffuse in this magnetic material portion. Therefore, the central angle corresponding to the outer circumferential portion of the effective magnetic pole tends to be wider than the central angle corresponding to the outer circumferential portion of the permanent magnet. The central angle corresponding to the outer circumferential portion of the permanent magnet can be made smaller by an angle equivalent to this diffusion. As a result, it is possible to set a larger space between the permanent magnets in the circumferential direction.

Conventionally, for this type of the rotor, skew-shaped permanent magnets or ring-shaped permanent magnets magnetized on the skew are used as cogging torque preventing means. The magnetization of such a permanent magnet is carried out by skew magnetization using a special magnetic yoke before incorporating the rotor into a case or the like. In a brushless DC motor according to the present invention, the central angle θm corresponding to the outer circumferential portion of the effective magnetic pole of each rotor block and the displacement angle of each rotor block are set so as not to exceed the central angle θp corresponding to the circumferential interval between the magnetic poles of the rotor. Therefore, after assembling the motor, the rotor blocks or the rotor can be magnetized by causing a direct current to flow in the stator and using the stator as the magnetic yoke. It is thus possible to achieve built-in magnetization of magnetizing the rotor in a non-magnetic state.

Note that the above-described first and second embodiments are illustrated on condition that the rotor or the permanent magnets are equally divided, but, if the changes in cogging torques of the divided rotor blocks or the rotor portions of the divided permanent magnets are substantially the same, it is not necessarily to divide the rotor and the permanent magnets equally, and it is needless to say that the materials of the permanent magnets can be different from each other. Further, while the first and second embodiments are illustrated with reference to a rotor constructed by burying permanent magnets as shown in FIGS. 14A, 14B, 14C near its surface along the outer circumference of the rotor core, it is needless to explain that the present invention is also applicable to rotors constructed by burying permanent magnets in concave-, V-, reversed circular arc- or flat plate-shape in the rotor core.

Third Embodiment

Figure 15:
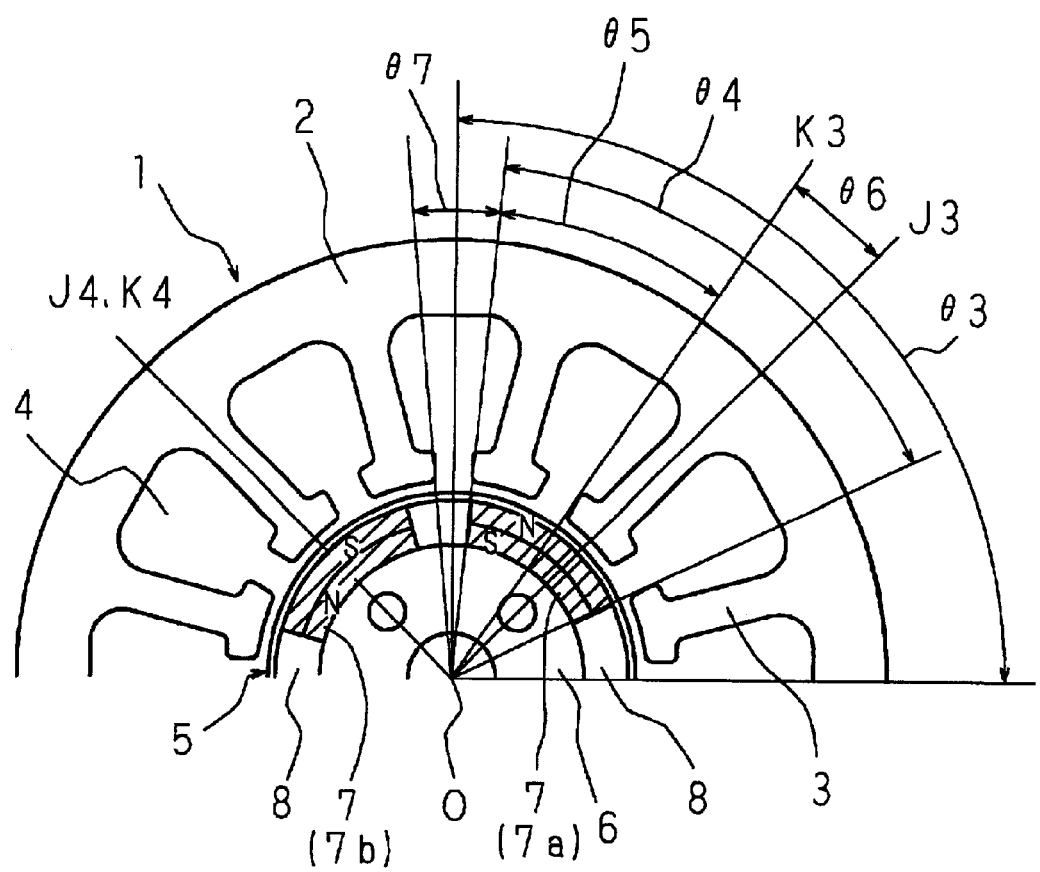
FIG. 15 is a cross sectional view showing partly the construction of a brushless DC motor according to the third embodiment of the present invention.

As shown in FIG. 15, the third embodiment is implemented by applying the present invention to a brushless DC motor comprising a magnet-buried type rotor 5 having four magnetic poles. In other words, the rotor 5 of this brushless DC motor has magnet mounting holes 8 formed at four positions along the outer circumference, and permanent magnets 7 are mounted in the magnet mounting holes 8, respectively. The permanent magnets 7 are arranged adjacent to the outer circumference of the rotor 5. For this reason, it can be said that the opening angle of each permanent magnet 7 seen from a rotational center axis O is equal to the effective polar opening angle. The permanent magnets 7 are arranged so that adjacent permanent magnets 7 have mutually opposite polarities. A stator 1 comprises a yoke 2 as an outer circumferential portion, and twelve teeth 3 that are provided at equal intervals and protrude from the yoke 2 toward the center. Adjacent teeth 3 form a slot 4 together with the yoke 2. Note that only the upper half portion is shown in FIG. 15 for simplification, but the lower half portion also has the same construction. Further, although not shown in FIG. 15, the teeth 3 are provided with windings in actual use.

In FIG. 15, J3 and J4 indicate the central lines of the magnet mounting holes 8, i.e., the pole central lines. They are owing to the core structure of the rotor 5. K3 and K4 indicate the central lines of the permanent magnets 7a and 7b, respectively, i.e., the central lines of the effective polar opening angles of the respective magnetic poles. They represent the center position of actual magnetic force. θ3 indicates the pitch angle owing to the structure of the rotor 5 seen from the rotational center axis O. θ4 indicates the effective polar opening angle of the permanent magnet 7a. θ5 indicates the slot pitch angle of the stator 1. θ6 indicates the deviation angle between the pole central line J3 of the magnetic pole of the permanent magnet 7a and the central line K3 of the effective polar opening angle. θ7 indicates the slot opening angle that is the opening angle between adjacent teeth 3. Here, one of the lines defining both ends of the slot pitch angle θ5 coincides with the central line K3 of the effective polar opening angle, but this is merely an accident and has no special meaning. Similarly, it is merely an accident that the other of the lines defining both ends of the slot pitch angle θ5 coincides with one of the lines defining both ends of the effective polar opening angle θ4. Furthermore, it is merely an accident that one of the lines defining both ends of the slot opening angle θ7 coincides with one of the lines defining both ends of the effective polar opening angle θ4.

According to the brushless DC motor shown in FIG. 15, in the magnetic pole of the permanent magnet 7a, there is an angular deviation between the pole central line J3 and the central line K3 of the effective polar opening angle, and the value of the deviation angle is θ6. On the other hand, in the magnetic pole of the permanent magnet 7b, the pole central line J4 and the central line K4 of the effective polar opening angle coincide with each other. In other words, the value of the deviation angle between them is zero. Thus, the two magnetic poles have a difference of θ6 in the deviation angle between the pole central line and the central line of the effective polar opening angle.

Figure 16:
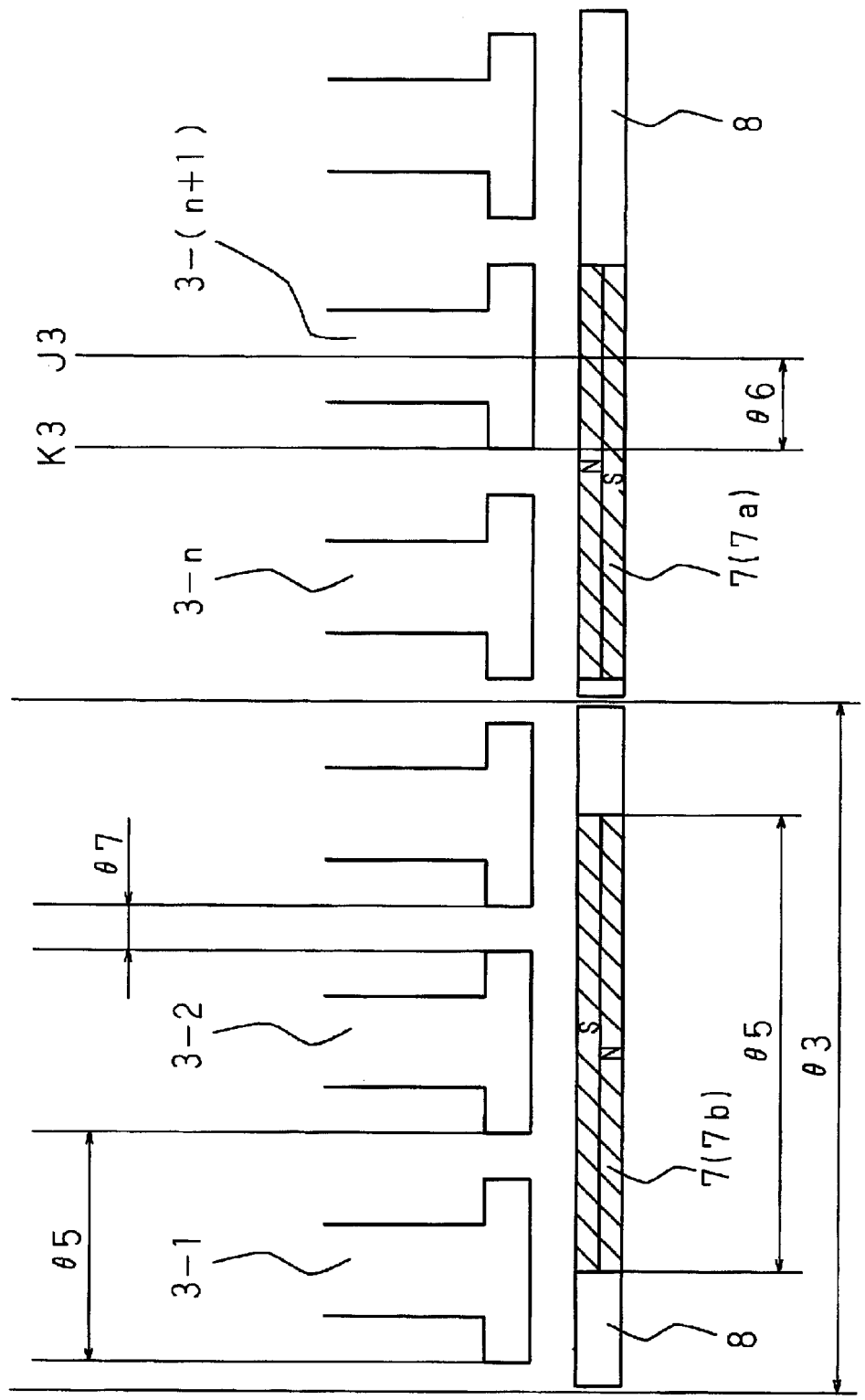
FIG. 16 is a linearly developed view showing the relationship between the magnetic poles of the rotor and the teeth of the brushless DC motor of FIG. 15.
Figure 17:
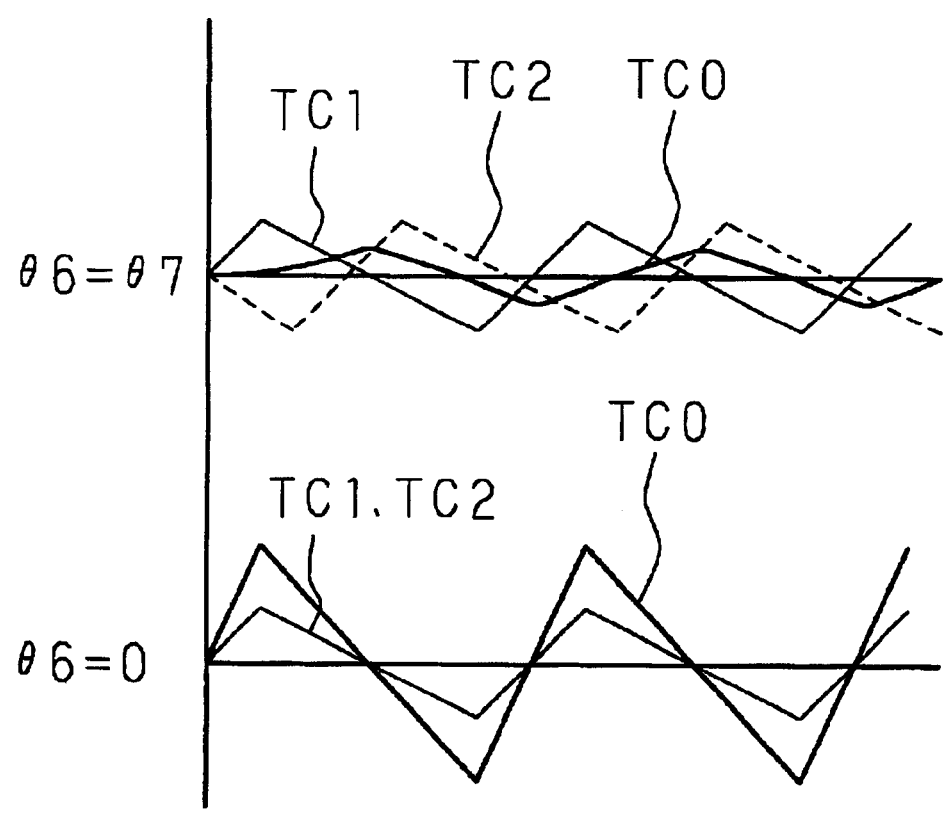
FIG. 17 is a waveform chart showing the composite condition of cogging torque of the brushless DC motor of FIG. 15 in comparison with the conventional one.

Referring to FIGS. 16 and 17, the following description will explain the state of cogging torque of the brushless DC motor having the above-mentioned construction. FIG. 16 shows the teeth 3 (3-1, 3-2, . . . , 3-n, 3-(n+1)), the magnet mounting holes 8 and the permanent magnets 7b and 7a of the brushless DC motor of FIG. 15 by linearly developing them. FIG. 17 shows the waveforms of cogging torques generated by the brushless DC motor. The upper row is a graph when the deviation angle θ6 is equal to the slot opening angle θ7 in the brushless DC motor of FIG. 15. The lower row is shown for a comparison purpose, and is a graph when the deviation angle θ6 is zero. Note that since θ4=θ5, in order to establish the relation 0.2×θ7≦θ6≦θ5−(0.2×θ7), it is necessary to satisfy θ7≦(5/6)θ5. However, since θ7 is usually equal to about a half of θ5 or less, the above expression would be established.

Let consider how the permanent magnets 7b and 7a move from the state shown in FIG. 16 toward the right direction in FIG. 16 with the rotation of the rotor. At this time, the left end of the permanent magnet 7b receives an attraction force from the tooth 3-1. This attraction force acts as interference to the movement of the permanent magnet 7b in the right direction. Then, when the left end of the permanent magnet 7b reaches a position closer to the tooth 3-2 than to the tooth 3-1, the left end of the permanent magnet 7b receives a force in a direction of assisting the movement. The reason for this is that the attraction force from the tooth 3-2 becomes dominant. Thus, the left end of the permanent magnet 7b generates cogging torque that repeats interference and assistance periodically with respect to the movement.

Similarly, the left end of the permanent magnet 7a generates cogging torque. However, there is a time difference between a timing in which the left end of the permanent magnet 7a receives a force in an interfering direction because of the relationship with the tooth 3-n and a timing in which the left end of the permanent magnet 7b receives a force in the interfering direction because of the relationship with the tooth 3-1. The time difference is a lag corresponding to the deviation angle θ6. There is also a time difference between the timings of receiving the force in the assisting direction. Hence, there is a phase angle equivalent to the deviation angle θ6 between the cogging torque generated by the left end of the permanent magnet 7b and the cogging torque generated by the left end of the permanent magnet 7a.

The graph in the upper row of FIG. 17 shows this state when the deviation angle θ6 is equal to the slot opening angle θ7. In other words, the thin solid line of this graph indicates cogging torque TC1 generated by the left end of the permanent magnet 7b. The broken line indicates cogging torque TC2 generated by the left end of the permanent magnet 7a. Further, the thick solid line indicates their composite cogging torque TC0. The amplitude of the cogging torque TC0 is much smaller than the sum of the amplitudes of the cogging torques TC1 and TC2. The reason for this is that there is a time difference between the peaks of the cogging torques TC1 and TC2 due to the phase difference therebetween and most of the torques cancel each other out.

If this state is compared with the graph in the lower row of FIG. 17 (obtained when the deviation angle θ6 is zero), the effect can be clearly understood. In other words, in the graph of the lower row, the amplitude of the cogging torque TC0 is equal to the sum of the amplitudes of the cogging torques TC1 and TC2 (which are equal to each other in the lower row of FIG. 17). There is no phase difference between the cogging torques TC1 and TC2, and thus the cogging torques TC1 and TC2 have the peaks simultaneously and the torques are added together as it is. In other words, the effect of the third embodiment is that the amplitude of the cogging torque TC0 in the graph of the upper row is much smaller than the amplitude of the cogging torque TC0 in the graph of the lower row.

Note that this type of brushless DC motor is generally designed so as to make the slot opening angle θ7 as small as possible. The reason for this is to make the magnetic resistance between the permanent magnets and the teeth as small as possible and ensure a large interlinkage magnetic flux. On the other hand, this makes the change rate (the maximum inclination of the curves shown in the graph of FIG. 17) of the individual cogging torques (corresponding to TC1 and TC2) generated by the respective permanent magnets steep. Here, if the deviation angle θ6 between the permanent magnets 7b and 7a is equal to the slot opening angle θ7, the abrupt changes of the individual cogging torques are effectively cancelled out. Therefore, the composite cogging torque (corresponding to TC0) becomes smaller. This is the reason why the upper row of FIG. 17 shows the example when θ6=θ7. Further, if the slot opening angle θ7 is equal to one second of the slot pitch angle θ5, the cogging torques TC1 and TC2 establish an antiphase relationship. In this case, the two cogging torques cancel each other out extremely well.

Figure 18:
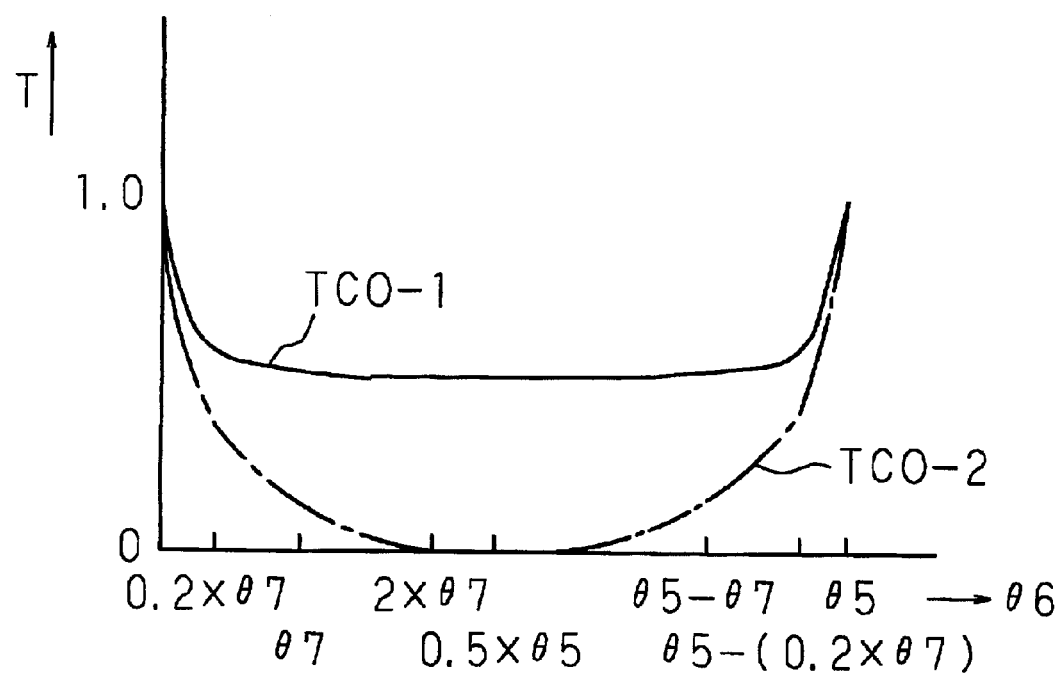
FIG. 18 is a graph showing the relationship between a deviation angle θ6 and the composite cogging torque.

FIG. 18 is a graph showing the relationship between the deviation angle θ6 and the peak value of the composite cogging torque. In this graph, the horizontal axis indicates the deviation angle θ6, and the deviation angle θ6 is within a range from zero to the slot pitch angle θ5. If the deviation angle θ6 is equal to the slot pitch angle θ5, since the permanent magnet deviates by an amount corresponding to one slot, this state is the same as a state where there is no deviation. The vertical axis indicates the pitch value of the composite cogging torque. The scale on the vertical axis shows a reference value by denoting a value obtained when the deviation angle θ6 is zero as 1. Moreover, in FIG. 18, two curves TC0-1 (solid line) and TC0-2 (alternate long and short dash line) are drawn. These two curves resulted from the difference between the waveforms of the individual cogging torques (corresponding to TC1 and TC2). The curve TC0-1 represents the state where there is a difference between the waveform at the time of rising and the waveform at the time of falling, i.e., even harmonics components are included. The curve shown in FIG. 17 belongs to this state though it is no so apparent. In an actual fact, this state occurs more frequently. The curve TC0-2 represents the state where the waveform at the time of rising and the waveform at the time of falling are symmetrical, i.e., even higher harmonics components are not included.

The following will be understood from the graph of FIG. 18. Regarding the curve TC0-1, at both ends (θ6=0, θ6=θ5), the value on the vertical axis is 1. The reason for this is that there is no deviation. At a slightly inward position in the direction of the horizontal axis, the value on the vertical axis abruptly decreases. This occurs because of the cancellation effect of cogging torques caused by the deviation. After coming to a position where the distances from both ends are 0.2 times the slot opening angle θ7 (θ6=0.2×θ7, θ6=θ5−(0.2×θ7)), the change of the value on the vertical axis becomes moderate at further inward positions. The reason for this is that the cogging torques do not completely cancel each other out because of the difference between the waveform at the time of rising and the waveform at the time of falling. Within this range, the value on the vertical axis has a minimum at the center in the direction of the horizontal axis (θ6=0.5×θ5), that is, substantially a half of the values at both ends. Thus, it can be understood that the range of the deviation angle θ6 for effectively obtaining the cogging torque reducing effect is 0.2×θ7≦θ6≦θ5−(0.2×θ7).

Moreover, in view of the curve TC0-2 in the graph of FIG. 18, there is no big difference from the curve TC0-1 in the vicinity of both ends. However, even within the range of 0.2×θ7≦θ6≦θ5−(0.2×θ7), the value on the vertical axis further decreases considerably. At the center (θ6=0.5×θ5), the value on the vertical axis becomes almost zero. The reason for this is that the cogging torques are more certainly cancelled out because the waveform at the time of rising and the waveform at the time of falling are symmetrical.

In the above-described manner, the overall cogging torque of the brushless DC motor of FIG. 15 is reduced by the deviation angle θ6. Moreover, in the brushless DC motor of FIG. 15, a magnetic pole (permanent magnet 7b) with a deviation angle of zero and a magnetic pole (permanent magnet 7a) with a deviation angle of θ6 are arranged next to each other. Therefore, even though the permanent magnet 7a has the deviation angle θ6, the center of gravity of the rotor 5 does not much deviate from the center of the axis. Therefore, the rotary balance of the rotary object is not affected very much. Thus, the rotation is performed smoothly.

Figure 19:
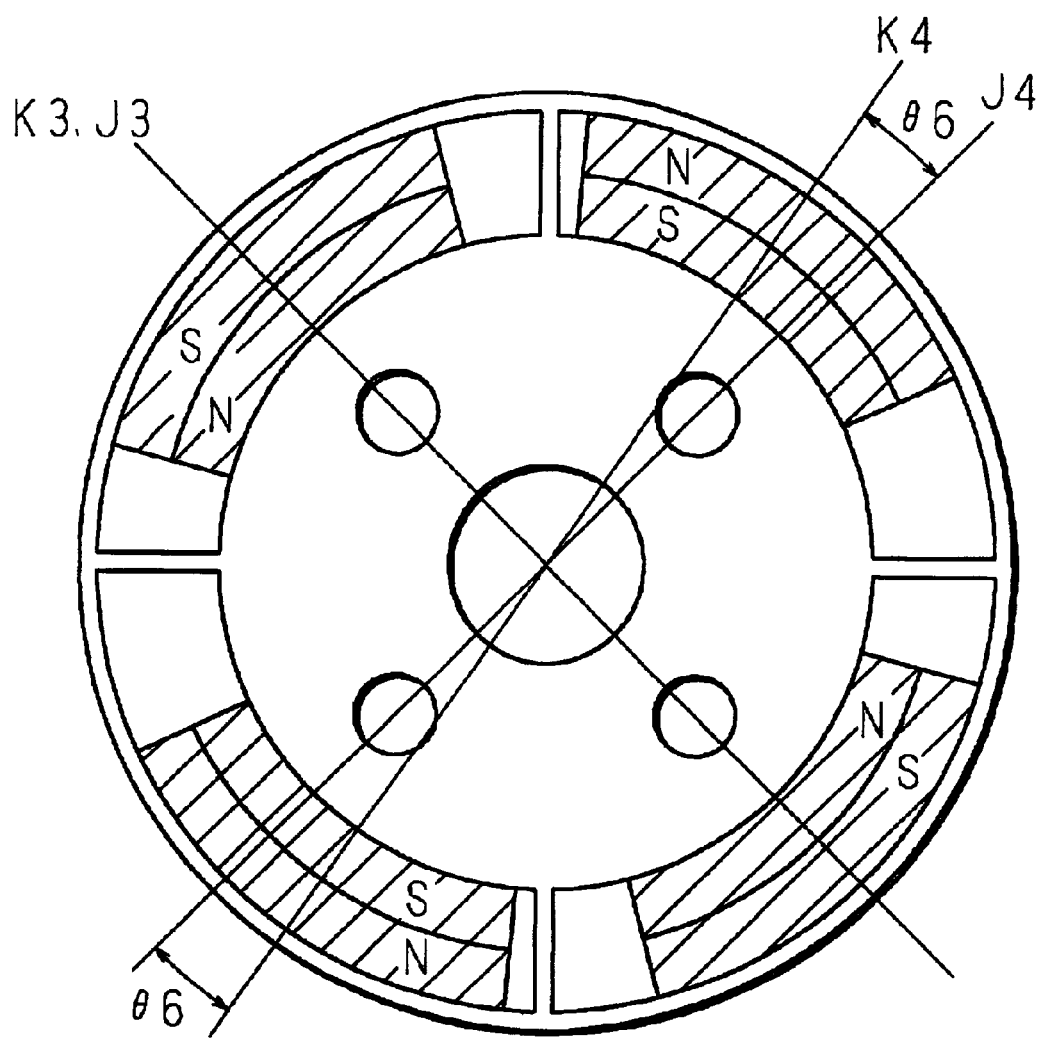
FIG. 19 is a view showing one example of the entire structure of the rotor of the brushless DC motor of FIG. 15.

Note that while FIG. 15 shows the upper half portion of the rotor 5, it is more preferable to arrange one magnetic pole with a deviation angle of zero and one magnetic pole with the deviation angle θ6 in its lower half portion in the same manner as in the upper half portion as shown in FIG. 19. Accordingly, two magnetic poles with a deviation angle of zero and two magnetic poles with the deviation angle θ6 are present in the rotor 5 as a whole, i.e., the number of the respective magnetic poles are equal to each other. Therefore, the reduction in cogging torque of the brushless DC motor as a whole is achieved more satisfactorily. Further, in the brushless DC motor shown in FIG. 19, magnetic poles with a deviation angle of zero and magnetic poles with the deviation angle θ6 are arranged at symmetrical positions. Accordingly, in the circumferential direction, the magnetic pole with a deviation angle of zero and the magnetic pole with the deviation angle θ6 are present alternately. Thus, the influence of the deviation angle on the position of the center of gravity of the rotor 5 is cancelled. Consequently, the center of gravity coincides with the center of the axis, and the rotary balance is very well.

Fourth Embodiment

The fourth embodiment adopts a block construction in which the rotor is divided in the axial direction. Here, an example in which the rotor is divided into two blocks will be explained. The rotor of the fourth embodiment comprises a block shown in FIG. 20A and a block shown in FIG. 20B. The number of magnetic poles in each block is 4, that is the same as in FIG. 15. Note that since the stator is the same as that shown in FIG. 15, it is omitted in FIGS. 20A and 20B.

Figure 20A:
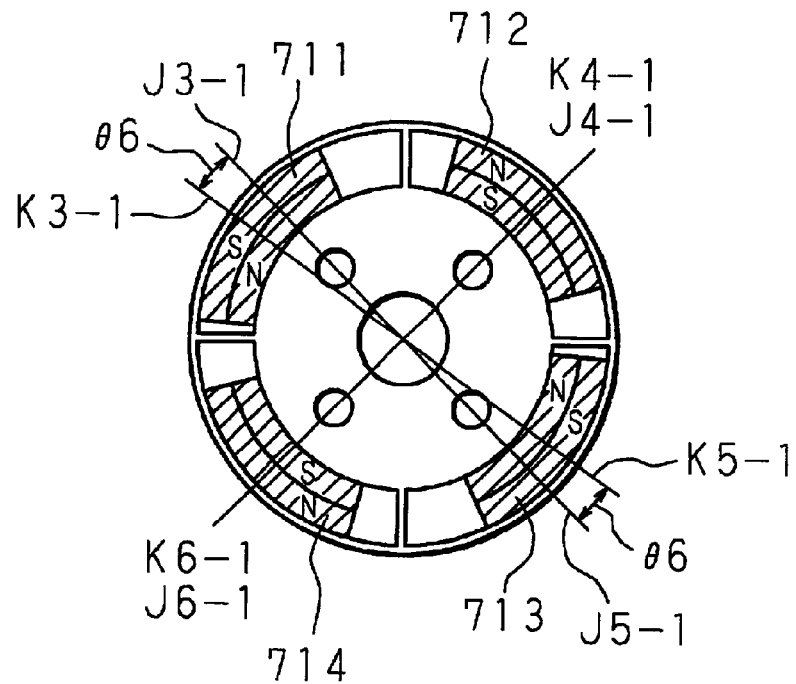
FIGS. 20A and 20B are cross sectional views showing the structure of the rotor of a brushless DC motor according to the fourth embodiment of the present invention.

In the block of FIG. 20A, the deviation angle in each magnetic pole is as follows. In the magnetic pole (permanent magnet 711) shown at the upper left in FIG. 20A, there is a deviation of angle θ6 between a pole central line J3-1 and an effective polar opening angle central line K3-1. In the magnetic pole (permanent magnet 712) shown at the upper right in FIG. 20A, a pole central line J4-1 and an effective polar opening angle central line K4-1 coincide with each other. In the magnetic pole (permanent magnet 713) shown at the lower right in FIG. 20A, like the upper left magnetic pole, there is a deviation of angle θ6 between a pole central line J5-1 and an effective polar opening angle central line K5-1. In the magnetic pole (permanent magnet 714) shown at the lower left in FIG. 20A, like the upper right magnetic pole, a pole central line J6-1 and an effective polar opening angle central line K6-1 coincide with each other. In short, two magnetic poles with a deviation angle of zero and two magnetic poles with the deviation angle θ6 are present, and they are arranged alternately in the circumferential direction.

Figure 20B:
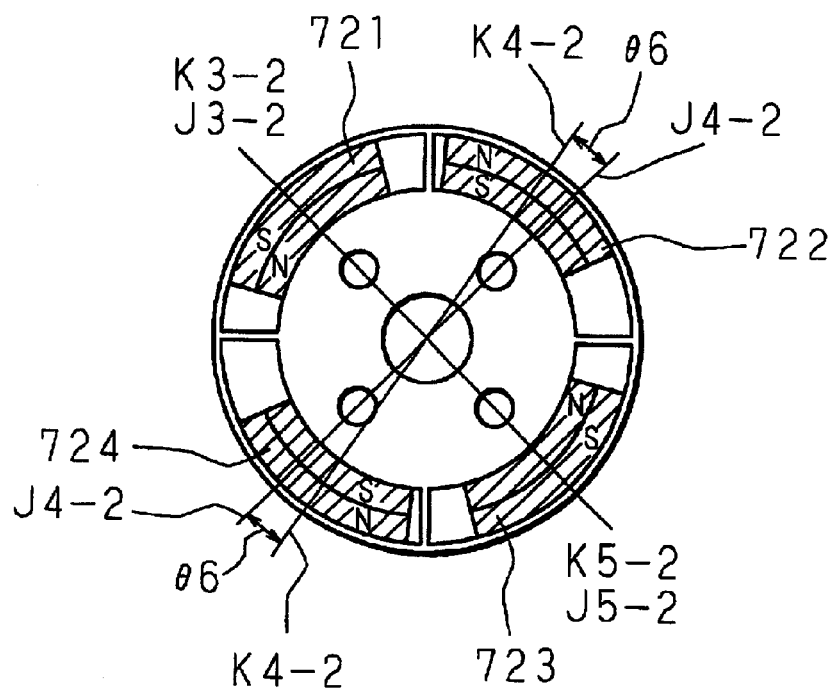

In the block of FIG. 20B, the deviation angle in each magnetic pole is as follows. In the magnetic pole (permanent magnet 721) shown at the upper left in FIG. 20B, a pole central line J3-2 and an effective polar opening angle central line K3-2 coincide with each other. In the magnetic pole (permanent magnet 722) shown at the upper right in FIG. 20B, there is a deviation of angle θ6 between a pole central line J4-2 and an effective polar opening angle central line K4-2. In the magnetic pole (permanent magnet 723) shown at the lower right in FIG. 20B, like the upper left magnetic pole, a pole central line J5-2 and an effective polar opening angle central line K5-2 coincide with each other. In the magnetic pole (permanent magnet 724) shown at the lower left in FIG. 20B, there is a deviation of angle θ6 between a pole central line J6-2 and an effective polar opening angle central line K6-2 like the upper right magnetic pole. In short, two magnetic poles with a deviation angle of zero and two magnetic poles with the deviation angle θ6 are present, and they are arranged alternately in the circumferential direction. This is the same as the previously illustrated structure in FIG. 19.

It can be seen by comparing these two blocks that the presence and absence of a deviation angle are the opposite between the corresponding magnetic poles in the axial direction. Therefore, the brushless DC motor of the fourth embodiment produces the following effects. Precisely, in each of the two blocks, as explained with reference to FIG. 19 above, the cogging torque is satisfactorily reduced and an excellent rotary balance is obtained. In addition, since the presence and absence of a deviation angle differ between the corresponding magnetic poles in the axial direction, the following effects are obtained. Namely, in the rotor as a whole, within a single magnetic pole (for example, the permanent magnet 711 and the permanent magnet 721, etc.), the cogging torques cancel each other out. Therefore, in the brushless DC motor as a whole, the individual cogging torques are respectively reduced. Consequently, the overall cogging torque is extremely small.

Moreover, regarding the rotary balance, the influence of he deviation is locally reduced at respective positions of the rotor. Therefore, this brushless DC motor is suitable for applications for abrupt acceleration or abrupt deceleration and also an application used in high-speed rotation. Further, in the corresponding magnetic poles in the axial direction, the magnetic poles of the permanent magnets are equal to each other. They include magnetic poles having a deviation and magnetic pole havings no deviation. For this reason, in the brushless DC motor as a whole, the effective polar opening angle is substantially widened. Moreover, the pole pitch of the rotor itself is an equal interval. Furthermore, in the gap between the rotor and the stator, the change in the magnetic flux density in the circumferential direction is smooth.

Fifth Embodiment

In the fifth embodiment, the number of magnetic poles in the circumferential direction of the rotor is made six. The rotor of the fifth embodiment has the construction shown in FIG. 21. In other words, a rotor 51 has magnet mounting holes 81 to 86 at six positions along the outer circumference, and permanent magnets 71 to 76 are mounted in the magnet mounting holes 81 to 86, respectively. The permanent magnets 71 to 76 are arranged so that the magnetic poles of adjacent permanent magnets are opposite to each other. Note that since there is no particular difference between the stator of this embodiment and the one shown in FIG. 15, the stator is omitted in FIG. 21.

In the rotor 51, the deviation angle in each magnetic pole is as follows. In the magnetic pole (permanent magnet 71) shown on the left side in FIG. 21, a pole central line J11 and an effective polar opening angle central line K11 coincide with each other. In the magnetic pole (permanent magnet 72) shown at the upper left in FIG. 21, there is a deviation of angle θ6 between a pole central line J12 and an effective polar opening angle central line K12. If the rotary direction of the rotor 51 is clockwise, then the line K12 is located on a position ahead the line J12 by an amount corresponding to the angle θ6. In the magnetic pole (permanent magnet 73) shown at the upper right in FIG. 21, there is a deviation of angle θ6 between a pole central line J13 and an effective polar opening angle central line K13. However, the direction of the deviation is opposite to that in the upper left magnetic pole, and thus the line K13 is located on a position behind the line J13 by an amount corresponding to the angle θ6. In the magnetic pole (permanent magnet 74) shown on the right side in FIG. 21, a pole central line J14 and an effective polar opening angle central line K14 coincide with each other like the left side magnet pole. In the magnetic pole (permanent magnet 75) shown at the lower right in FIG. 21, there is a deviation of angle θ6 between a pole central line J15 and an effective polar opening angle central line K15 in the leading direction like the upper left magnetic pole. In the magnetic pole (permanent magnet 76) shown at the lower left in FIG. 21, there is a deviation of angle θ6 between a pole central line J16 and an effective polar opening angle central line K16 in the lagging direction like the upper right magnetic pole.

In short, two magnetic poles with a deviation angle of zero, two magnetic poles with the deviation angle θ6 in the leading direction, and two magnetic poles with the deviation angle θ6 in the lagging direction are present, and thus the number of the respective magnetic poles are the same. Magnetic poles having a deviation angle other than these three deviation angles do no exist. Further, magnetic poles having a deviation angle in mutually opposite directions are arranged on both sides (the left and right sides) of a magnetic pole having a deviation angle of zero.

Figure 21:
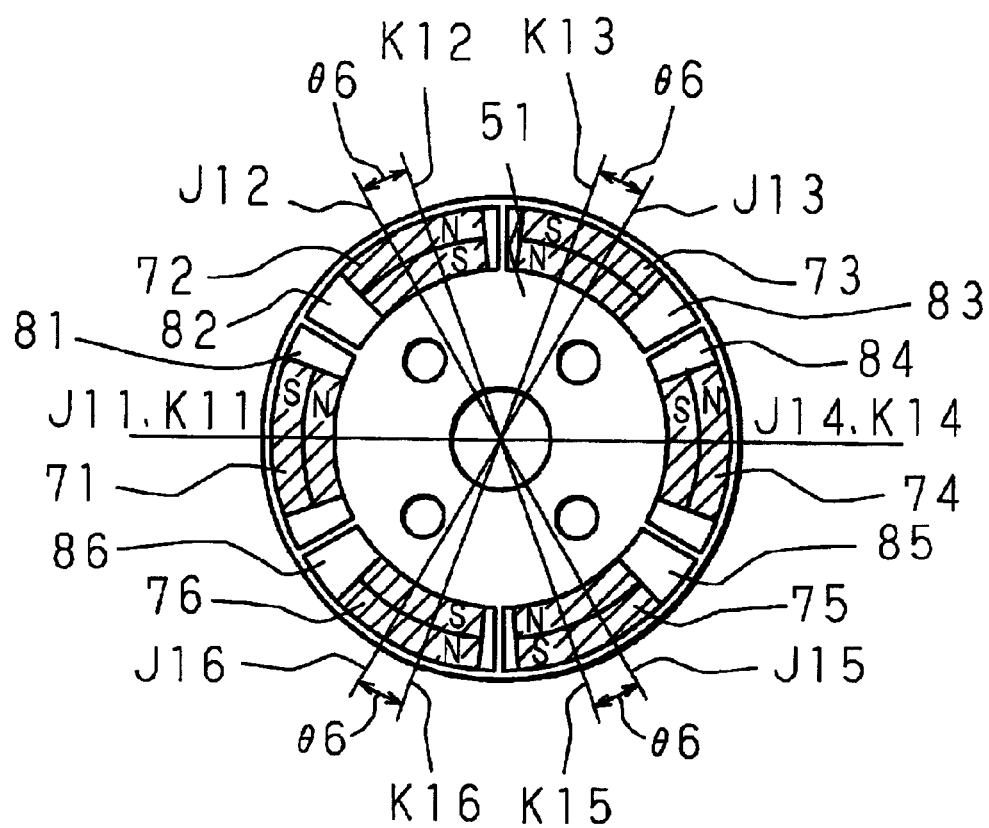
FIG. 21 is a cross sectional view showing the structure of the rotor of a brushless DC motor according to the fifth embodiment of the present invention.
Figure 22:
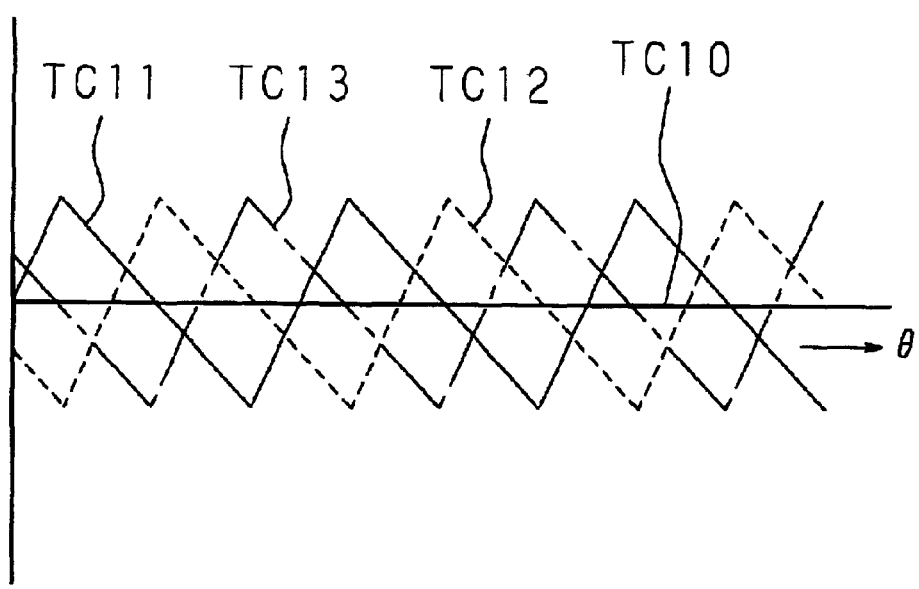
FIG. 22 is a waveform chart showing the composite condition of cogging torques of the brushless DC motor of FIG. 21.

In the brushless DC motor comprising the rotor 51 of the above-described structure, the cancellation of cogging torques is performed as shown in the waveform chart of FIG. 22. In the waveform chart of FIG. 22, the thin solid line indicates cogging torque TC11 generated by the left and right magnetic poles in FIG. 21. The broken line indicates cogging torque TC12 generated by the upper right and lower left magnetic poles in FIG. 21. The alternate long and short dash line indicates cogging torque TC13 generated by the upper left and lower right magnetic poles in FIG. 21. Moreover, the thick solid line indicates composite cogging torque TC10 resulting from combining them. Note that FIG. 21 shows the waveforms when the magnitude of the deviation angle θ6 is equal to one third of the slot pitch angle θ5. Thus, in the fifth embodiment, the cancellation of cogging torques is carried out by three-phase composition. Therefore, the composite cogging torque TC10 shown in FIG. 21 is almost zero. Even when the individual cogging torques are asymmetrical waveforms containing even higher harmonics components, the overall cogging torque is very satisfactorily reduced. Moreover, even when there is slight distortion in the waveforms or there is a slight variation in the magnitude of the individual cogging torques, the effect is stable.

Here, if the rotor 51 of FIG. 21 is seen carefully, it can be understood that three adjacent magnetic poles in the circumferential direction can never include magnetic poles having the same deviation angle (including the direction). This fact is established for any three adjacent magnetic poles. In the rotor 51, therefore, the influence of the deviation on the rotary balance is locally eliminated in the respective positions. Consequently, the brushless DC motor of the fifth embodiment has excellent rotary performance.

Sixth Embodiment

Figure 23A:
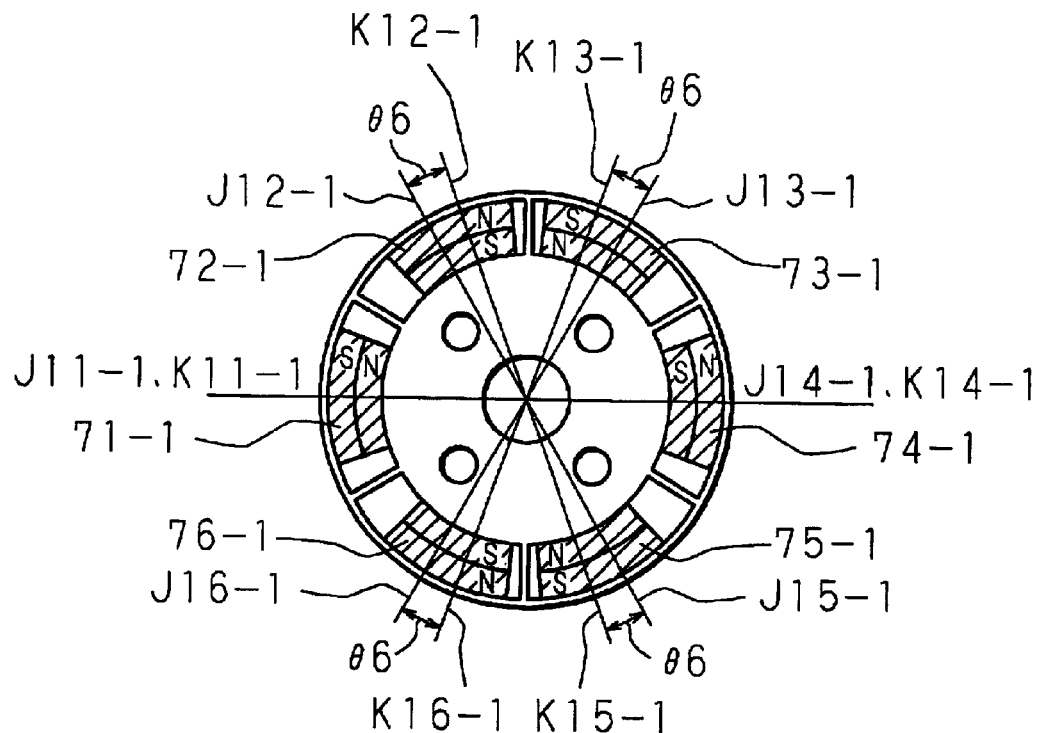
FIGS. 23A and 23B are cross sectional views showing the structure of the rotor of a brushless DC motor according to the sixth embodiment of the present invention.
Figure 23B:
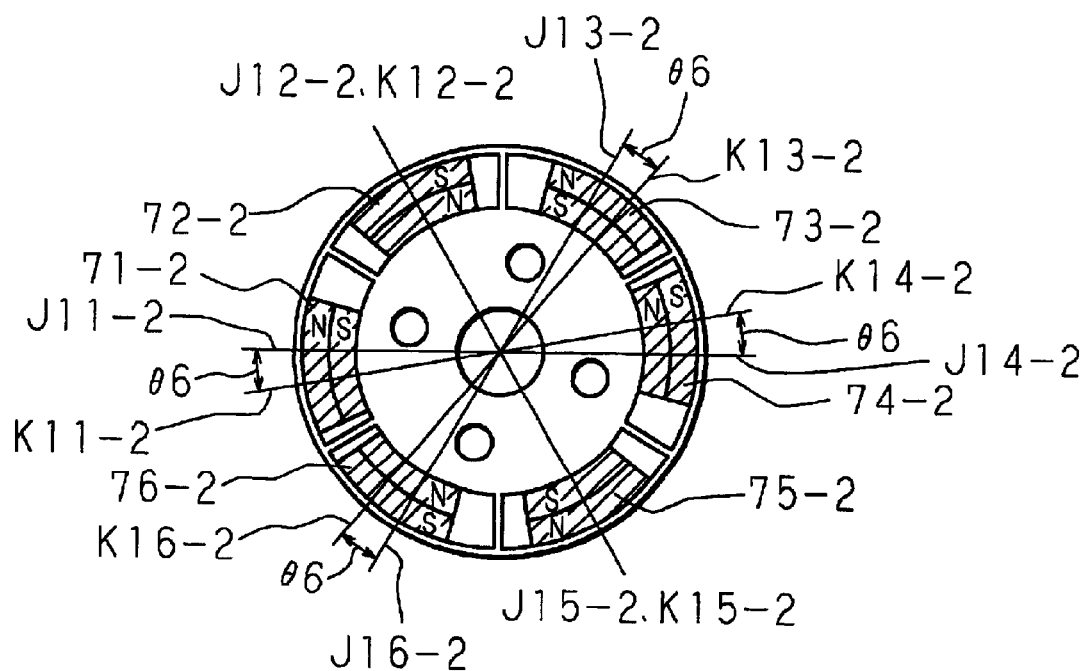

The sixth embodiment shown in FIGS. 23A and 23B is a combination of the fourth and fifth embodiments. In other words, the sixth embodiment comprises six magnetic poles and employs a divided-block structure. A rotor of the sixth embodiment comprises a block shown in FIG. 23A and a block shown in FIG. 23B. Note that the illustration of the stator is also omitted in the sixth embodiment.

In the block of FIG. 23A, the deviation angle in each magnetic pole is as follows. In the magnetic pole (permanent magnet 71-1) shown on the left side in FIG. 23A, a pole central line J11-1 and an effective polar opening angle central line K11-1 coincide with each other. In the magnetic pole (permanent magnet 72-1) shown at the upper left in FIG. 23A, there is a deviation of angle θ6 in the leading direction between a pole central line J12-1 and an effective polar opening angle central line K12-1. In the magnetic pole (permanent magnet 73-1) shown at the upper right in FIG. 23A, there is a deviation of angle θ6 in the lagging direction between a pole central line J13-1 and an effective polar opening angle central line K13-1. In the magnetic pole (permanent magnet 74-1) shown on the right side in FIG. 23A, a pole central line J14-1 and an effective polar opening angle central line K14-1 coincide with each other. In the magnetic pole (permanent magnet 75-1) shown at the lower right in FIG. 23A, like the upper left magnetic pole, there is a deviation of angle θ6 in the leading direction between a pole central line J15-1 and an effective polar opening angle central line K15-1. In the magnetic pole (permanent magnet 76-1) shown at the lower left in FIG. 23A, like the upper right magnetic pole, there is a deviation of angle θ6 in the lagging direction between a pole central line J16-1 and an effective polar opening angle central line K16-1. This is the same as that shown in FIG. 21.

In the block of FIG. 23B, the deviation angle in each magnetic pole is as follows. In the magnetic pole (permanent magnet 71-2) shown on the left side in FIG. 23B, there is a deviation of angle θ6 in the lagging direction between a pole central line J11-2 and an effective polar opening angle central line K11-2. In the magnetic pole (permanent magnet 72-2) shown at the upper left in FIG. 23B, a pole central line J12-2 and an effective polar opening angle central line K12-2 coincide with each other. In the magnetic pole (permanent magnet 73-2) shown at the upper right in FIG. 23B, there is a deviation of angle θ6 in the leading direction between a pole central line J13-2 and an effective polar opening angle central line K13-2. In the magnetic pole (permanent magnet 74-2) shown on the right side in FIG. 23B, like the left side magnetic pole, there is a deviation of angle θ6 in the lagging direction between a pole central line J14-2 and an effective polar opening angle central line K14-2. In the magnetic pole (permanent magnet 75-2) shown at the lower right in FIG. 23B, like the upper left magnetic pole, a pole central line J15-2 and an effective polar opening angle central line K15-2 coincide with each other. In the magnetic pole (permanent magnet 76-2) shown at the lower left in FIG. 23B, like the upper right magnetic pole, there is a deviation of angle θ6 in the leading direction between a pole central line J16-2 and an effective polar opening angle central line K16-2.

It can be seen by comparing these two blocks that the corresponding magnetic poles in the axial direction absolutely have different deviation angles. Therefore, the brushless DC motor of the sixth embodiment produces the following effects. Namely, in these two blocks, as explained with reference to FIG. 21 (the fifth embodiment) above, the cogging torque is satisfactorily reduced and an excellent rotary balance is achieved. In addition, the effects explained in FIGS. 20A and 20B (the fourth embodiment) are also obtained because of the difference in the deviation angle between the corresponding magnetic poles in the axial direction. In other words, in the rotor as a whole, the cancellation of cogging torques and rotary unbalance is performed even within a single magnetic pole. Consequently, the overall cogging torque is extremely small, and the rotary balance is excellent.

Seventh Embodiment

In the seventh embodiment, instead of providing a deviation in the positions of permanent magnets, cancellation of cogging torques between the magnetic poles is achieved by other means. The other means is implemented by providing convex portions corresponding to the magnetic poles on the periphery of the rotor core and shifting the position of the convex portion in each magnetic pole. A rotor 52 of the seventh embodiment has the construction shown in FIG. 24. The rotor 52 has four magnetic poles. However, unlike the third through sixth embodiments, each permanent magnet is mounted in the center of each magnet mounting hole. In other words, in every magnetic pole, the pole central line (J21, etc.) and the effective polar opening angle central line (K21, etc.) coincide with each other.

Figure 24:
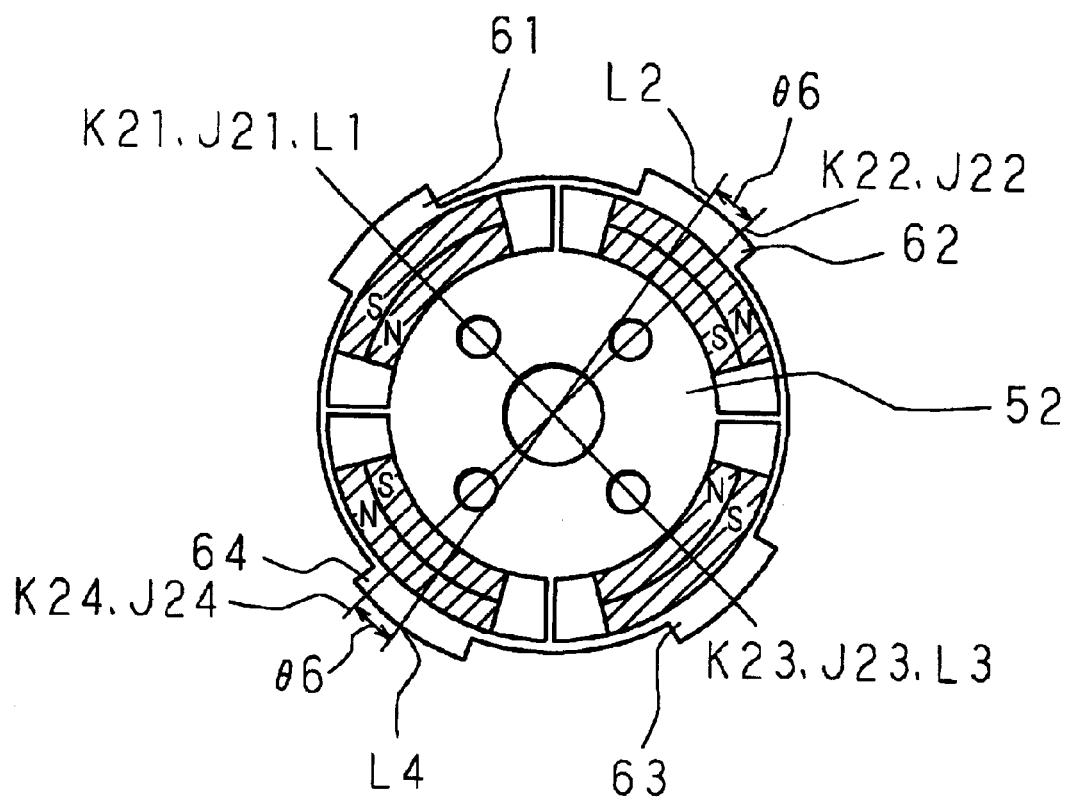
FIG. 24 is a cross sectional view showing the structure of the rotor of a brushless DC motor according to the seventh embodiment of the present invention.

However, the rotor 52 has convex portions 61 to 64 corresponding to the respective magnetic poles on its outer circumference. In FIG. 24, L1 to L4 represent the central lines of the respective convex portions 61 to 64 seen from the rotational center axis O. Moreover, in the convex portion 61 shown at the upper left in FIG. 24, the convex portion central line L1 coincides with a pole central line J21 and an effective polar opening angle central line K21. In the convex portion 62 shown at the upper right in FIG. 24, the convex portion central line L2 is located on a position deviated from a pole central line J22 and an effective polar opening angle central line K22, and the deviation angle is θ6. In the convex portion 63 shown at the lower right in FIG. 24, like the convex portion 61, the convex portion central line L3 coincides with a pole central line J23 and an effective polar opening angle central line K23. In the convex portion 64 shown at the lower left in FIG. 24, like the convex portion 62, the convex portion central line L4 is located on a position deviated at the angle θ6 from a pole central line J24 and an effective polar opening angle central line K24. The convex portions 61 to 64 in FIG. 24 are drawn in an exaggerated manner to facilitate understanding, and, in an actual fact, the difference in level caused by the convex portions is very small.

In a brushless DC motor using the rotor 52, in each magnetic pole, the gap between the rotor and the stator is smaller and the magnetic resistance is smaller in a position where the convex portion is present than in the outside of this position. Therefore, magnetic flux converges on this position and the positions including the convex portions dominantly contribute to the generation of cogging torque.

Thus, similarly to explanation given in the third embodiment, etc., the effect of reducing the cogging torque is produced by the presence of the convex portions having a deviation angle and the convex portions having no deviation angle.

Moreover, in the seventh embodiment, since no deviation is introduced in the permanent magnets, the following effects are also produced. Precisely, the influence of the deviation of the convex portions on the position of the center of gravity of the rotor is much smaller than that of the permanent magnets. Therefore, an extremely good rotary balance is obtained. Furthermore, the absence of deviation in the permanent magnets allows the use of the largest possible permanent magnet within the range of the magnet mounting hole. In addition, it is also possible to allow the permanent magnet to fully occupy the space within the pole pitch. In this case, stronger rotary force is obtained. Even if such a large permanent magnet is not used, the seventh embodiment has a merit that the degree of freedom in designing the brushless DC motor is high. Besides, the cogging torque generated by a single magnetic pole is also smaller compared to one without convex portion. The reason for this is that an end of a permanent magnet and an end of a convex portion generate cogging torques, respectively, and there is a phase difference between them.

Eighth Embodiment

Figure 25:
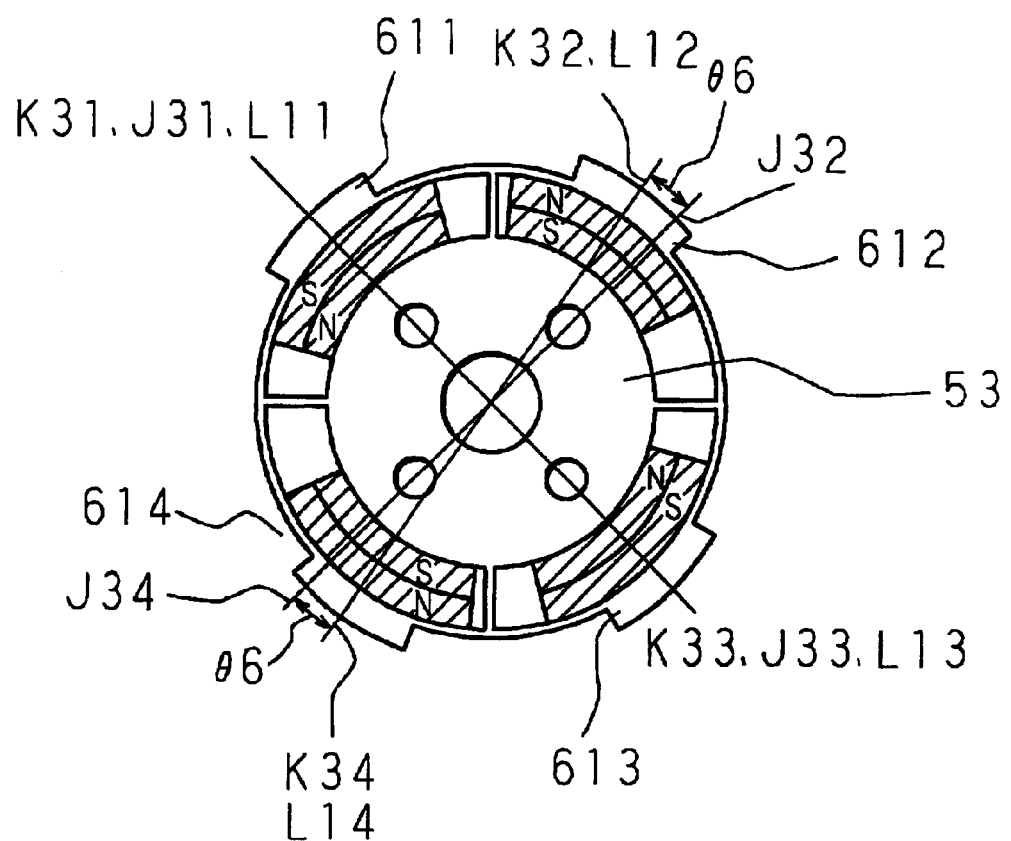
FIG. 25 is a cross sectional view showing the structure of the rotor of a brushless DC motor according to the eighth embodiment of the present invention.

In the eighth embodiment, deviations are introduced in both of the permanent magnets and the convex portions. A rotor 53 of the eighth embodiment is constructed as shown in FIG. 25. In the rotor 53, the deviation angle in each magnetic pole is as follows. In the magnetic pole (convex portion 611) shown at the upper left in FIG. 25, all of a pole central line J31, an effective polar opening angle central line K31 and a convex portion central line L11 coincide with each other. In the magnetic pole (convex portion 612) shown at the upper right in FIG. 25, both of an effective polar opening angle central line K32 and a convex portion central line L12 are located on a position deviated from a pole central line J32 at the angle θ6. In the magnetic pole (convex portion 613) shown at the lower right in FIG. 25, like the upper left magnetic pole, all of a pole central line J33, an effective polar opening angle central line K33 and a convex portion central line L13 coincide with each other. In the magnetic pole (convex portion 614) shown at the lower left in FIG. 25, like the upper right magnetic pole, both of an effective polar opening angle central line K34 and a convex portion central line L14 are located on a position deviated from a pole central line J34 at the angle θ6. In the (upper right and lower left) magnetic poles having a deviation, the deviation angle of the convex portion and the deviation angle of the permanent magnet are both θ6. Therefore, in any magnetic pole, the convex portion is positioned at the center of the permanent magnet.

In the rotor 53, a reduction in cogging torque by the magnetic poles having a deviation and the magnetic poles having no deviation is achieved by both of the permanent magnets and the convex portions. Moreover, the coincidence of the center of the permanent magnet and the center of the convex portion in each magnetic pole produces the following effects. First, the magnetic force of the permanent magnets is more effectively utilized. This effect is produced by the presence of the convex portion at the center of the permanent magnet. Here, it is also possible to cancel the cogging torques, depending on the relationship between the slot pitch angle and the angular difference between an end of the permanent magnet and an end of the convex portion.

Modified Examples of Third through Eighth Embodiments

Figure 26:
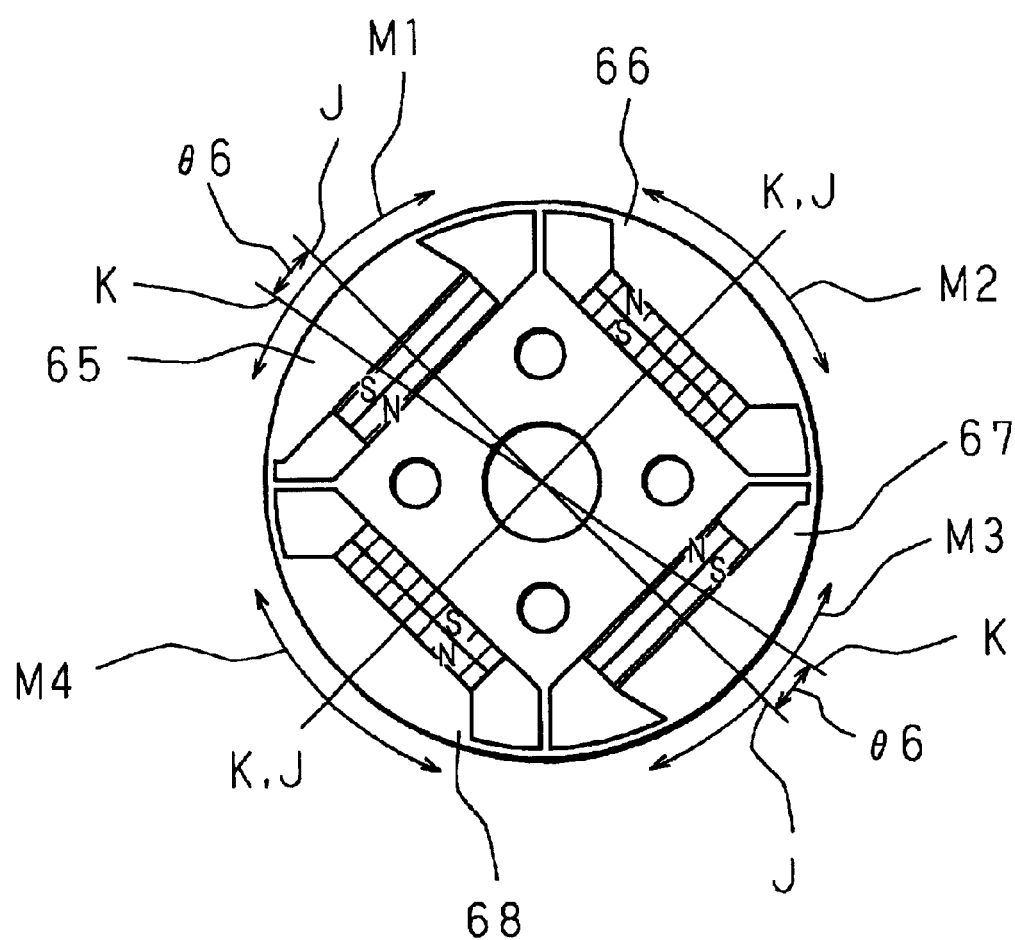
FIG. 26 is a cross sectional view showing a modified example of the structure of the rotor of the brushless DC motor of the present invention.

Next, the following description will explain modified examples of the configurations of the rotor core and the permanent magnet. A modified example shown in FIG. 26 is an example of application to a structure having a relatively long distance between the outer circumference of the rotor core and the permanent magnets. In the rotor of FIG. 26, linear permanent magnets are used. Further, there are substantially bow-shape magnetic regions 65 to 68 between the respective permanent magnets and the outer circumference of the rotor. The periphery of the magnetic regions 65 to 68 form effective polar opening angles M1 to M4. In this rotor, the permanent magnets are arranged at an equal pitch, and no deviation is introduced. However, there is a difference in the configuration among the magnetic regions 65 to 68. Specifically, in the upper right and lower left magnetic regions 66 and 68, the right side and the left side are symmetrical about a pole central line J. Therefore, the pole central line J and an effective polar opening angle central line K coincide with each other. However, in the upper left and lower right magnetic regions 65 and 67, the right side and the left side are asymmetrical. Hence, there is a deviation angle θ6 between the pole central line J and the effective polar opening angle central line K. Thus, a reduction in cogging torque is achieved by the presence or absence of a deviation angle in each magnetic pole.

Figure 27:
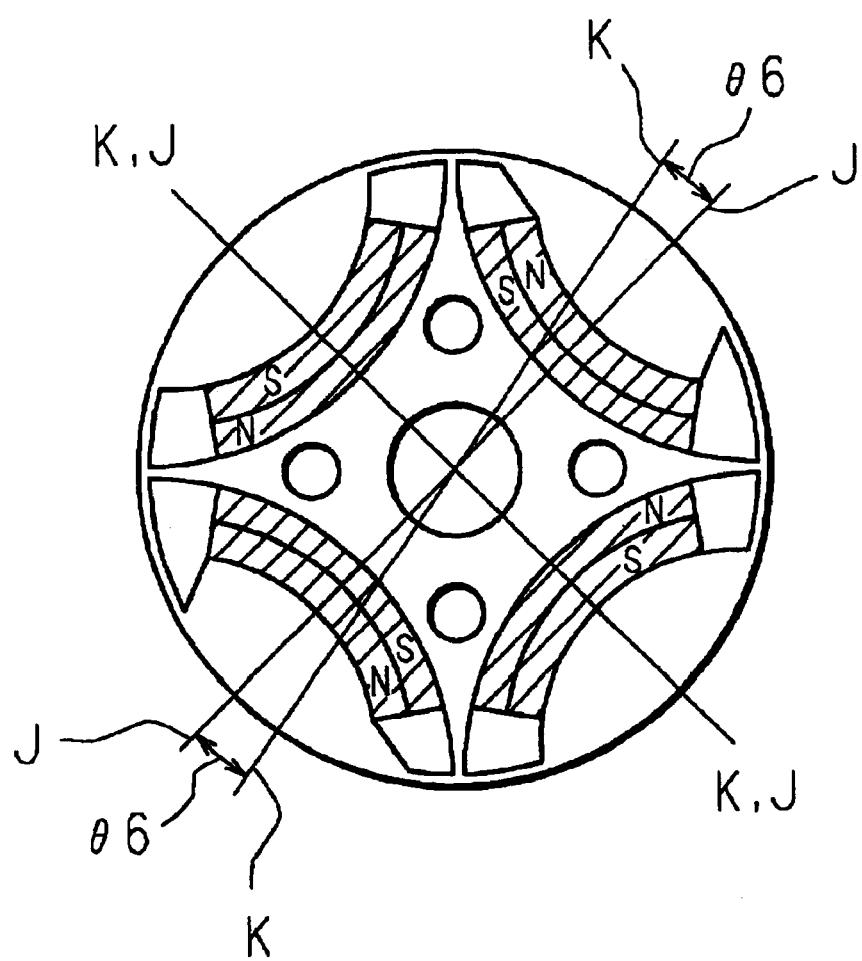
FIG. 27 is a cross sectional view showing another modified example of the structure of the rotor of the brushless DC motor of the present invention.

FIG. 27 shows an example implemented by replacing the permanent magnets of FIG. 26 with curved permanent magnets. In this rotor, there is also the presence or absence of a deviation angle in each magnetic pole because of the difference in the configuration among the magnetic regions between the permanent magnets and the outer circumference of the rotor. Thus, a reduction in cogging torque is achieved. The modified examples shown in FIG. 26 or FIG. 27 are applicable to any one of the third through eighth embodiments. It is not necessarily to limit the permanent magnets to those shown in FIG. 26 or FIG. 27, and the permanent magnets may be replaced with permanent magnets of any known configuration, such as V-shape, V-(concave-) shape with a base, bow-(reversed semicircular-) shape, or arrangement.

As explained in detail above, in the third through eighth embodiments, the deviation angle between the pole central line and the effective polar opening angle central line varies according to each magnetic pole. Therefore, the individual cogging torques generated by the respective magnetic poles are not in phase. Accordingly, a brushless DC motor whose overall cogging torque is reduced by the cancellation of the individual cogging torques is realized. In particular, by setting the deviation angle difference θ6 within the range of $0.2 \times \theta7 \leq \theta6 \leq \theta5 - (0.2 \times \theta7)$ with respect to the slot pitch angle θ5 and the slot opening θ7, the cogging torque can be effectively reduced.

Moreover, considering the direction of the deviation angle, if three types of magnetic poles including a reference magnetic pole, a magnetic pole having a deviation angle in the leading direction and a magnetic pole having a deviation angle in the lagging direction are provided, it is also possible to cancel the cogging torques by three-phase composition. In this case, even if the individual cogging torques are asymmetrical waveforms or the like, it is possible to achieve a particularly significant reduction in cogging torque. Further, in either of the two-phase and three-phase cases, by equalizing the number of magnetic poles having each deviation angle, more satisfactory results are obtained. In particular, in the three-phase case, by arranging all of the magnetic poles to have any one of the three deviation angles and equalizing the number of magnetic poles having each deviation angle, it is possible to reduce the overall cogging torque to near zero practically.

Additionally, by arranging adjacent magnetic poles in the circumferential direction not to have the same deviation angle, the influence of the deviation angle on the position of the center of gravity of the rotor is reduced. It is thus possible to minimize the deterioration of the rotary balance. In particular, in the three-phase case, by arranging any three adjacent magnetic poles in the circumferential direction to include all of the three deviation angles, the rotary balance can be almost perfectly maintained.

Besides, in the case where the rotor is a block construction in which the rotor is divided in the axial direction, if the blocks are arranged so that the corresponding magnetic poles in the axial direction have mutually different deviation angles, there are merits on both the reduction in cogging torque and the maintenance of the rotary balance.

Furthermore, the reduction in cogging torque by the difference in the deviation angle is achievable by providing convex portions corresponding to the magnetic poles on the outer circumference of the rotor and introducing a deviation angle in the positions of the convex portions, instead of introducing a deviation angle in the effective polar opening angle central lines. In this case, the deviation in the positions of the convex portions has the advantage that the influence on the rotary balance is extremely small in comparison with the deviation in the positions of the permanent magnets.

Note that in the third embodiment, etc., the magnetic poles having no deviation between the pole central line and the effective polar opening angle central line and the magnetic pole having the deviation angle θ6 are taken into consideration, but "magnetic poles having no deviation" are not essential. In short, the point is the presence of a relative difference in the deviation angle between the magnetic poles. Thus, it is also possible to set a magnetic pole having a deviation angle θ0 between the pole central line and the effective polar opening angle central line as a standard and provide magnetic poles having a deviation angle given by the addition of θ6 to θ0 or the subtraction of θ6 from θ0. The same thing can also be said for the deviation angle of the convex portions in the seventh or eighth embodiment. Note that a combination of the deviation angle of the convex portions in the seventh or eighth embodiment and the divided-block structure is of course available.

Ninth Embodiment

Figure 28:
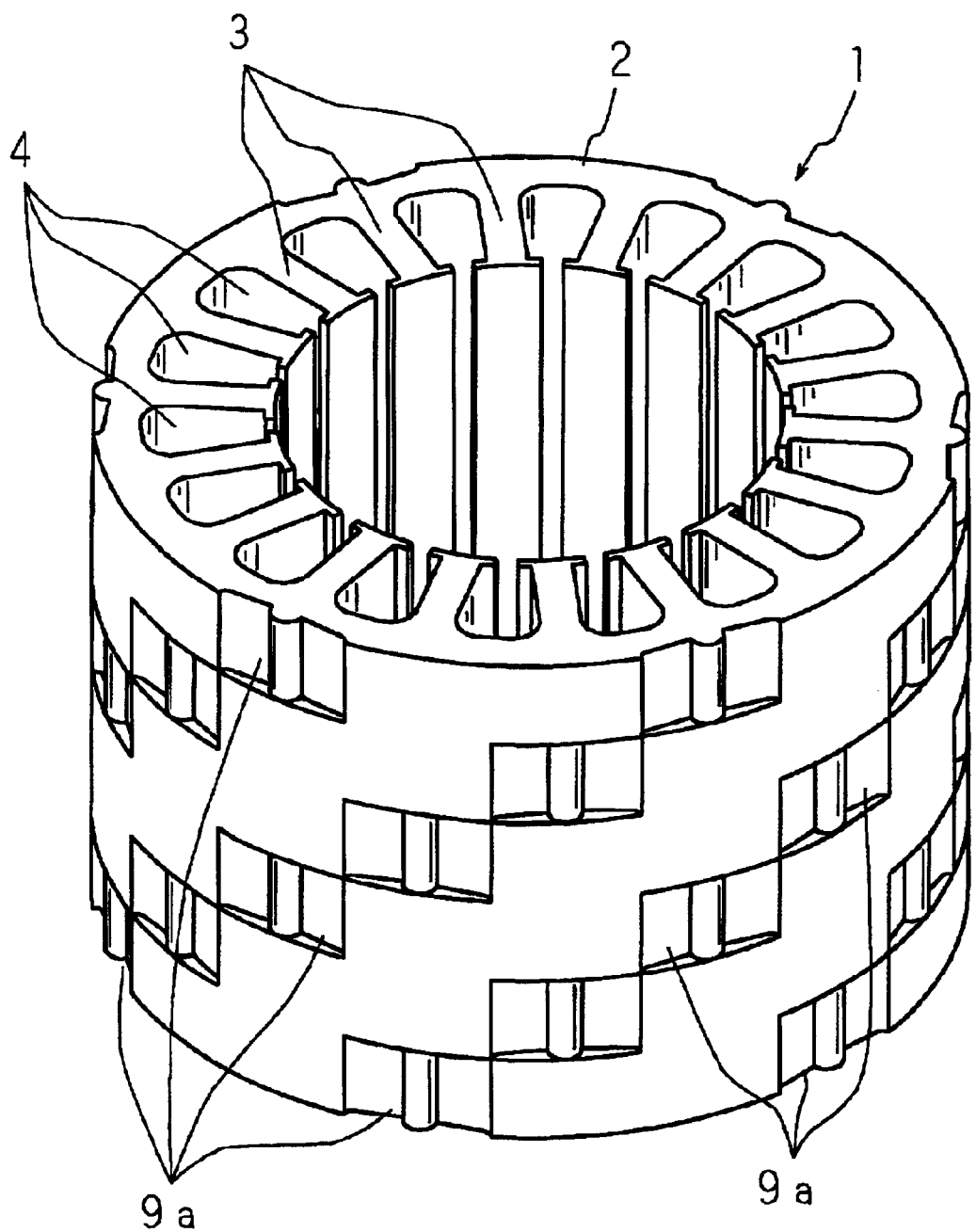
FIG. 28 is a perspective view showing the construction of one example of the stator of a brushless DC motor according to the ninth embodiment of the present invention.

FIG. 28 is a perspective view showing the construction of a stator of a brushless DC motor according to the ninth embodiment of the present invention. This stator 1 is formed by layering a number of thin electromagnetic steel plates and fixing them integrally, and comprises a yoke 2 that is formed as an outer circumferential portion and teeth 3 that are provided at equal intervals to protrude from the yoke 2 toward the center. Adjacent teeth 3 form a slot 4 together with the yoke 2. Actually, armature windings (not shown) are wound on the teeth 3 and stored in the slots 4.

In the thin electromagnetic steel plate, a portion corresponding to the notch portion 9a is provided at the outer circumferential surface portion of the yoke 2 near the outside of a portion corresponding to every third tooth 3. The portion corresponding to the notch portion 9a has a protrusion therein so as to facilitate layering and welding of the thin electromagnetic steel plates. Blocks are formed by layering substantially an equal number of such thin electromagnetic steel plates at equal angle so that the notch portion 9a of every third tooth 3 has substantially an equal length in the layering direction. These blocks are layered while displacing them at a predetermined angle in the circumferential direction so that the portions corresponding to the notch portions 9a are aligned. The notch portions 9a of each block are formed so that they do not overlap adjacent notch portions 9a in the circumferential direction.

Figure 29:
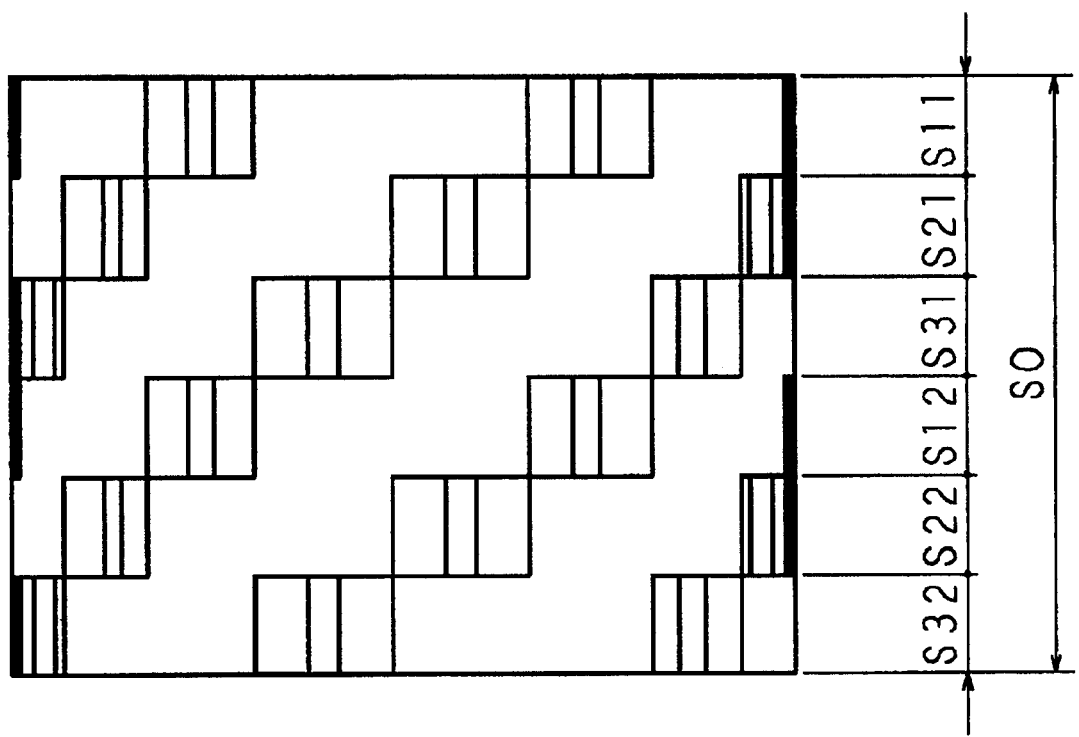
FIG. 29 is a side view showing the construction of the stator.

Accordingly, as shown in the side view of the stator 1 of FIG. 29, the stator 1 is a construction comprising layers of a multilayer block segment having a notch portion 9a on the outside of every third tooth 3 and a thickness S11; a multilayer block segment which is displaced from the above multilayer block segment by an amount corresponding to one tooth 3 in the circumferential direction and has a notch portion 9a on the outside of every third tooth 3 and a thickness S21; a multilayer block segment which is similarly displaced from the above multilayer block segment by an amount corresponding to one tooth 3 in the circumferential direction and has a notch portion 9a on the outside of every third tooth 3 and a thickness S31; a multilayer block segment which is similarly displaced from the above multilayer block segment by an amount corresponding to one tooth 3 in the circumferential direction and has a notch portion 9a on the outside of every third tooth 3 and a thickness S12; a multilayer block segment which is similarly displaced from the above multilayer block segment by an amount corresponding to one tooth 3 in the circumferential direction and has a notch portion 9a on the outside of every third tooth 3 and a thickness S22; and a multilayer block segment which is similarly displaced from the above multilayer block segment by an amount corresponding to one tooth 3 in the circumferential direction and has a notch portion 9a on the outside of every third tooth 3 and a thickness S32.

The multilayer block segments with the thickness S11, S21, S31 and the multilayer block segments with the thickness S12, S22, S32 have the notch portions 9a at the same positions in the circumferential direction respectively. Here, the following equation (4) is satisfied.

$$S11+S12=S21+S22=S31+S32 \tag{4}$$

Besides, if the total thickness is S0, then the thickness of the multilayer block segments without the notch portions 9a of each tooth 3 is given by the following equation (5).

$$S0 - (S11 + S12) = S0 - (S21 + S22) \tag{5}$$
$$= S0 - (S31 + S32)$$

Figure 30:
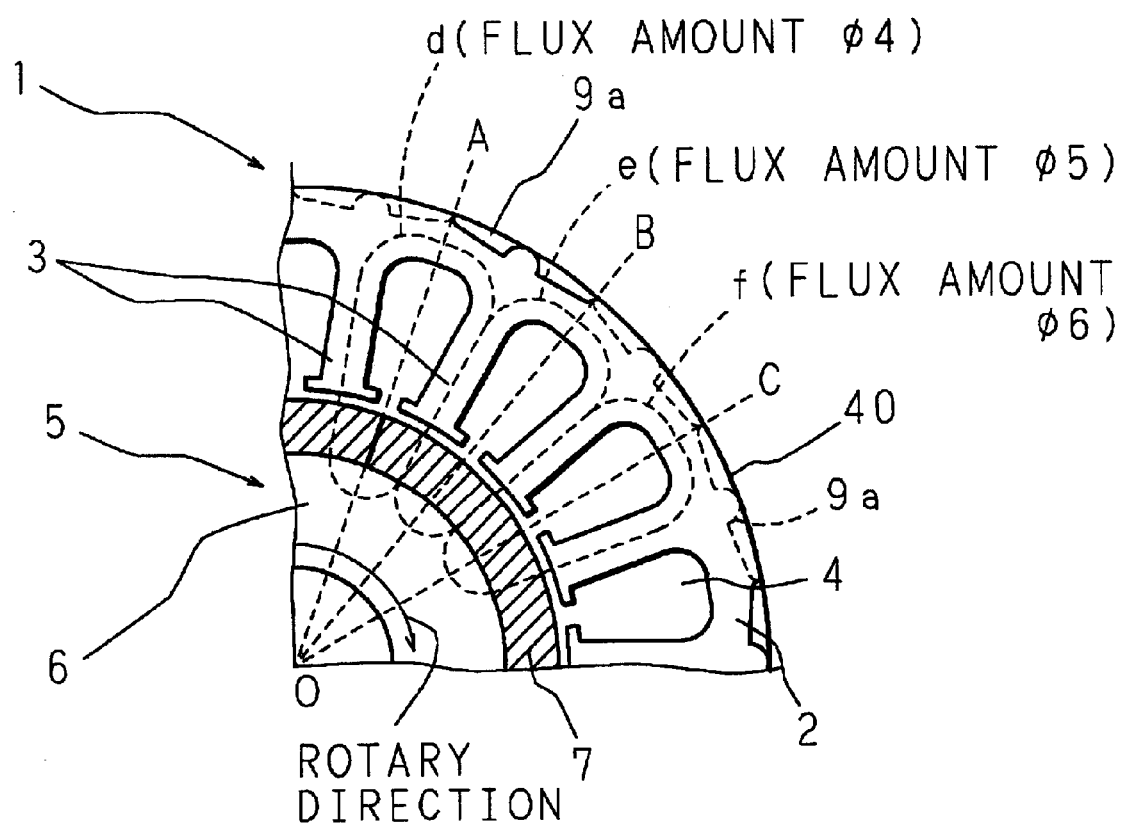
FIG. 30 is a view showing the state of magnetic flux in the brushless DC motor of the present invention.

FIG. 30 is a view showing the state of magnetic flux in such a brushless DC motor. Here, a rotor 5 constructed by attaching permanent magnets 7 to the surface of a rotor core 6 is disposed in the stator 1 shown in FIG. 28. The stator 1 has the construction explained with reference to FIGS. 28 and 29. Note that the rotor 5 may be a buried-type rotor constructed by burying the permanent magnets 7 in the rotor core 6.

In each portion of the stator 1, magnetic flux generated because of the relative positional relationship with each region between magnetic poles of the opposing permanent magnets 7 of the rotor 5 flows. The magnetic flux is shown by indicating the flux amount of a magnetic path d at a position where the notch portion 9a whose length in the layering direction is equal to S11 is present on the outer circumference side of the tooth 3 of the stator 1 as φ4, indicating the flux amount of a magnetic path e which is adjacent to the magnetic path d and located at a position where the notch portion 9a whose length in the layering direction is equal to S11 is present on the outer circumference side of the tooth 3 of the stator 1 as φ5, and indicating the flux amount of a magnetic path f adjacent to the magnetic path e as φ6.

Here, as shown in FIG. 30, if straight lines A, B and C are drawn from the center of the shaft hole of the rotor 5 toward the outer circumference of the stator 1 through the center of the slots 4, then, when a region between the magnetic poles of the permanent magnets 7 of the rotor 5 is positioned on the straight line A, the magnetic flux from the permanent magnets 7 near the region between the magnetic poles form a closed circuit of the flux amount $\phi 4$ by the magnetic path d shown by a dotted line. Moreover, when the region between the magnetic poles of the permanent magnets 7 of the rotor 5 reaches the straight line B as a result of clockwise rotation of the rotor 5, the magnetic flux from the permanent magnets 7 near the region between the magnetic poles form a closed circuit of the flux amount $\phi 5$ by the magnetic path e shown by a dotted line. When the region between the magnetic poles of the permanent magnets 7 of the rotor 5 reaches the straight line C as a result of further clockwise rotation of the rotor 5, the magnetic flux from the permanent magnets 7 near the region between the magnetic poles form a closed circuit of the flux amount $\phi 6$ by the magnetic path f shown by a dotted line.

For example, suppose that the notch portions 9a are aligned in the layering direction over a multilayer block thickness S0 of the stator 1. At this time, the flux amount flowing in the yoke 2 having the notch portions 9a in the layering direction of the teeth 3 is denoted as $\phi 1a$, and the flux amount flowing in the yoke 2 having no notch portions 9a in the layering direction of the teeth 3 is denoted as $\phi 1b$. Then, both of portions having the notch portions 9a and portions having no notch portions 9a in the layering direction are present in the construction of the stator 1 shown in FIG. 30. Therefore, when the region between the magnetic poles of the permanent magnets 7 of the rotor 5 is positioned on the straight line A, the flux amount $\phi 4$ of the magnetic path d with the straight line A as the center is given by the following equation (6).

$$\phi 4 = \phi 1a \times (S11+S12)/S0 + \phi 1b \times (S0-(S11+S12))/S0 \qquad (6)$$

Similarly, when the region between the magnetic poles of the permanent magnets 7 of the rotor 5 is positioned on the straight line B, the flux amount $\phi 5$ of the magnetic path e with the straight line B as the center is given by the following equation (7).

$$\phi 5 = \phi 1a \times (S21+S22)/S0 + \phi 1b \times (S0-(S21+S22))/S0 \qquad (7)$$

Likewise, when the region between the magnetic poles of the permanent magnets 7 of the rotor 5 is positioned on the straight line C, the flux amount $\phi 6$ of the magnetic path f with the straight line C as the center is given by the following equation (8).

$$\phi 6 = \phi 1a \times (S31+S32)/S0 + \phi 1b \times (S0-(S31+S32))/S0 \qquad (8)$$

Here, it is apparent by substituting equations (4) and (5) for equations (6), (7) and (8) that the magnetic coupling between the stator 1 and the rotor 5 can be made stable coupling with less fluctuation because the flux amounts $\phi 4$, $\phi 5$ and $\phi 6$ of the magnetic paths d, e and f in the yoke 2 are constant even when the region between the magnetic poles of the rotor 5 is positioned on any one of the straight lines A, B and C. In other words, the cogging torque can never increase locally depending on the rotational position of the rotor 5, thereby restricting the generation of sound and vibration resulting from the cogging torque.

Figure 31:
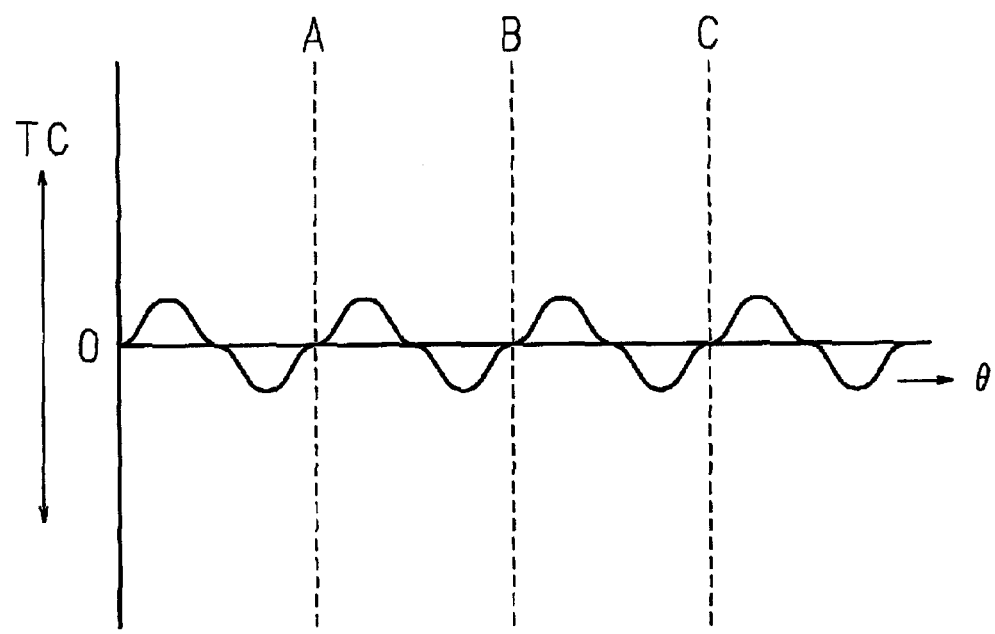
FIG. 31 is a view showing the change of cogging torque of the brushless DC motor of the present invention.

Regarding the magnitude of the cogging toque, as shown in FIG. 31, since there is no protruding portion on the straight lines A to C, the torque does not change abruptly and thereby reducing the cogging torque relatively. In FIG. 31, the vertical axis indicates the cogging torque TC, while the horizontal axis indicates the rotation angle $\theta$ of the rotor 5, and the positions of the straight lines A to C in FIG. 30 correspond to the positions of the straight lines A to C in FIG. 31.

It is also apparent from the above description and equations (4) to (8) that the same effects are obtained even when the notch portions 9a on the outer circumference side of the stator 1 of an arbitrary tooth 3 are distributed to any positions in the layering direction. For example, in the construction shown in FIG. 30, if the thin electromagnetic steel plates are layered by introducing a displacement corresponding to up to one tooth 3 whenever one thin electromagnetic steel plate is layered, the notch portions 9a are aligned whenever three thin electromagnetic steel plates are layered. Accordingly, if a large number of plates are layered, the total length, in the layering direction, of the notch portions 9a provided for each tooth 3 of the stator 1 becomes substantially equal, and thus the objective of the ninth embodiment can be achieved.

Besides, for example, in the method of layering the thin electromagnetic steel plates of the stator 1 by introducing a displacement of a predetermined angle whenever one thin electromagnetic steel plate is layered as described above, the known automatic clamp control for punching and integrally fixing the thin electromagnetic steel plates at the same time becomes complicated, and the punching speed can not be increased. However, by employing a block structure including a plurality of notch portions 9a aligned in the layering direction, it is possible to simplify the punching control and increase the punching speed, thereby improving the productivity.

Figure 32:
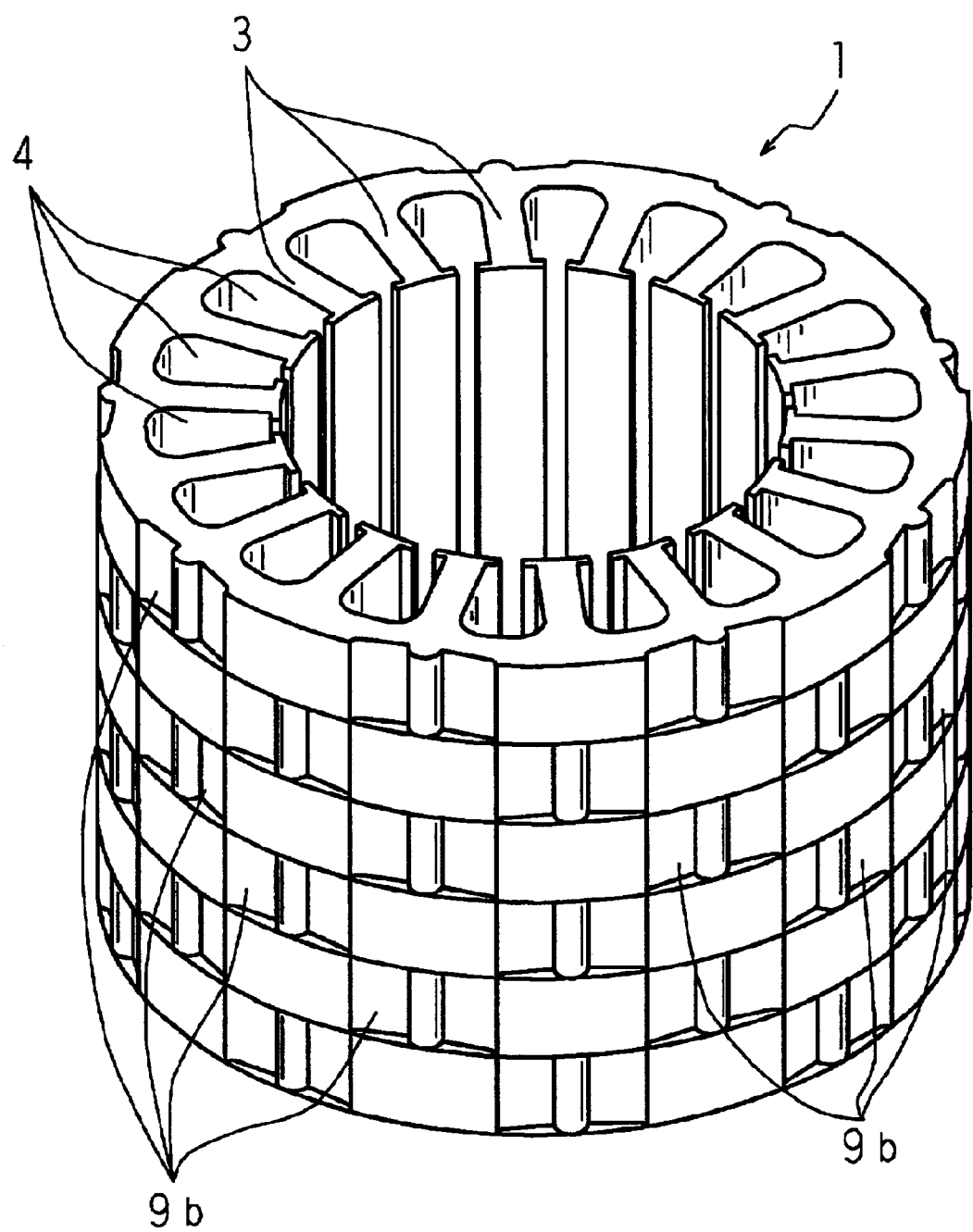
FIG. 32 is a perspective view showing the construction of another example of the stator of the brushless DC motor according to the ninth embodiment of the present invention.

Further, in the above-described example, for the thin electromagnetic plates that forms the stator 1, a portion corresponding to the notch portion 9a is provided at an outer circumferential portion equivalent to every third tooth 3. However, as shown in FIG. 32, for the thin electromagnetic plates forming the stator 1, a portion corresponding to the notch portion 9b may be provided at an outer circumferential portion corresponding to every other tooth 3. In this case, even when the notch portion 9b is provided in the magnetic path, the region between the magnetic poles of the permanent magnets 7 of the rotor 5 is present to face any one of the slots 4, thereby achieving the objective of the ninth embodiment.

If the thin electromagnetic steel plates are layered while displacing them at a predetermined angle so that the notch portion 9b is provided in the outer circumferential portion of every other tooth 3, it is possible to punch every notch portion 9b at a minimum displacement angle corresponding to a single tooth 3, and thus the number of punching processes is reduced. For example, in the case where the notch portions 9b are punched by moving the stator 1 at a desired angle, it is possible to increase the punching speed and improve the productivity. In other case, if the total length, in the layering direction, of the notch portions 9b provided for each tooth 3 of the stator 1 is substantially equal, the objective of the ninth embodiment can be achieved.

In particular, in the case where a countermeasure against deterioration of cogging torque is implemented by a slight adjustment of cogging torque, the notch portions 9a to be provided on the outer circumference side of the stator 1 are arranged within the pitch range of the teeth 3 so that they do not overlap each other in the circumferential direction of the stator 1. In other words, it is necessary that adjacent notch portions 9a in the layering direction do not overlap each other.

Figure 33:
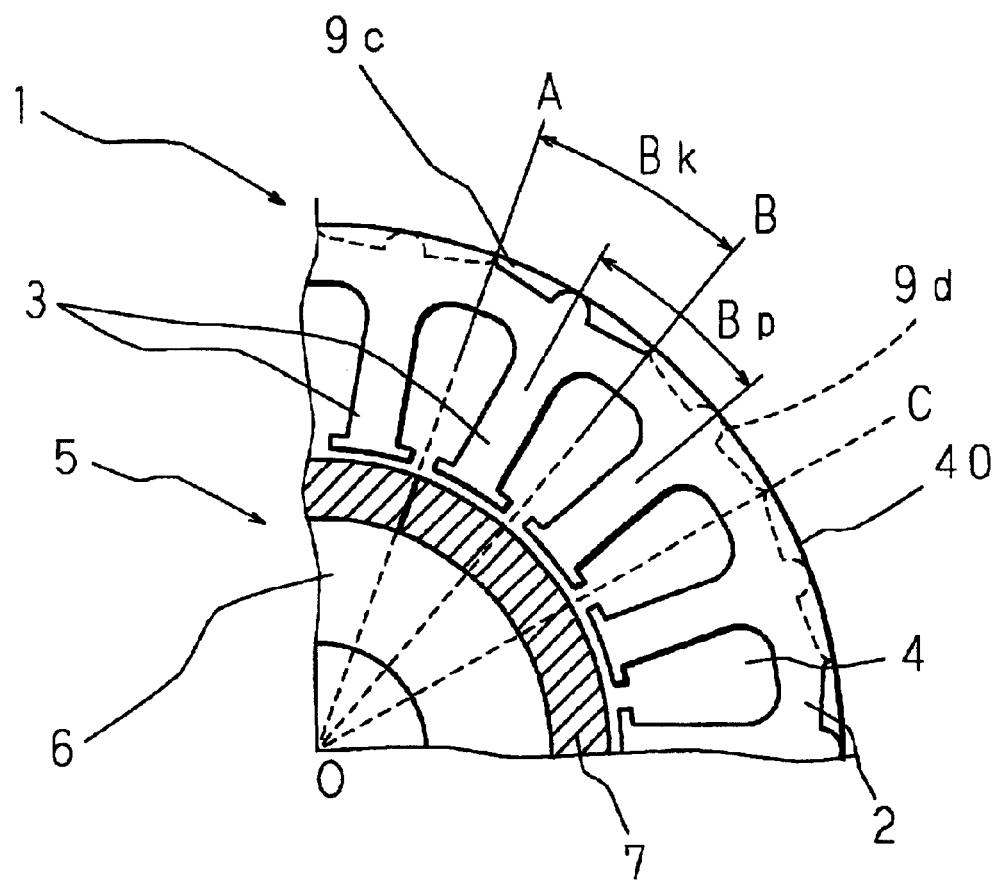
FIG. 33 is a view showing the relationship between the pitch of teeth and notch portions.

Here, as shown in FIG. 33, notch portions 9c and 9d are provided on the outer circumference side of the teeth 3, the pitch angle of the teeth 3 is made Bp, the central angle corresponding to the outer circumferential portion of each of the notch portions 9c and 9d is made Bk, the length of the notch portion 9c on the upper side of the layer is made S11, the length of the notch portion 9d on the lower side of the layer is made S21, an outer circumferential surface where no notch portions 9c and 9d are present is made a circular-arc portion 40 to obtain the layered condition as shown in FIGS. 28 and 29.

When Bp<Bk, i.e., when adjacent notch portion 9c and notch portion 9d in the circumferential direction overlap each other, since both ends of this overlapped portion protrude, the magnetic flux easily leaks from the tips of these ends. The amount of this leakage magnetic flux changes largely depending on a slight difference in the configuration of the notch portions, and the magnetic flux intended to pass through the magnetic path of the yoke 2 of the stator 1 leaks outside. Thus, the flux amount passing through the yoke 2 in the outer circumferential portion of the teeth 3 is not stable and varies according to the notch width of each of the notch portion 9c and notch portion 9d, resulting in deterioration of cogging torque. In particular, this phenomenon appears more noticeably as the notch portions 9c, 9d and the circular-arc portion 40 form a more acute angle. Moreover, a small-size high-output motor with higher magnetic flux density in the yoke 2 is largely affected by this phenomenon.

Accordingly, in FIG. 33, the central angle Bk corresponding to the outer circumferential portion of each of the notch portions 9c and 9d is set so as not to be larger than at least the pitch Bp of the teeth 3, and the notch portion 9c and the circular-arc portion 40 of the outer circumferential surface are alternately provided on the outer circumference side of the stator 1. Thus, it is seen from FIGS. 33, 28 and 29 that the portions corresponding to the notch portions 9c of the layered thin electromagnetic steel plates are arranged so as not to overlap the portions corresponding to adjacent notch portions 9d of the thin electromagnetic steel plates displaced at an angle in the cross section in the layering direction.

When the central angle Bk is increased to a maximum, Bp=Bk. In this case, on the outer circumference of the stator 1 in the side view, an end of the notch portion 9c and an end of the notch portion 9d are arranged in contact with each other in the circumferential direction. Accordingly, there is no protrudent portion where the tips of the above-mentioned two ends are in contact with each other and the magnetic flux leaks, and thus the leakage magnetic flux from the stator 1 to the outside can be significantly reduced.

Note that adjacent notch portions in the layering direction have been explained with reference to the notch portions 9c and 9d on the outer circumference of the stator 1, but the same explanation is applied to all the notch portions shown in FIGS. 28 and 29. Moreover, by setting Bp=Bk, in the outer circumference of the stator 1, the portions of the corner sections where burr is created due to the notch portions 9c and 9d can be reduced to one second, thereby decreasing fitting defects in fitting into a case or the like.

Note that while the above-described ninth embodiment illustrates the notch portions of the outer circumference of the stator, the cavity portions provided in the outer circumference side of the stator can be explained in the same manner.

What is claimed is:

1. A brushless DC motor comprising:

a rotor having plural permanent magnets; and a stator having plural slots, wherein said rotor is divided into three rotor blocks in a rotation axis direction, and said three rotor blocks are layered so that arrangement angles of said rotor blocks differ from each other by an amount of a mechanical angle in a rotary direction that is equivalent to one third of a pulsation period of cogging torque generated by said rotor and stator;

wherein a sum of an effective polar opening angle of one of said permanent magnets and a difference between the arrangement angles of said rotor block located on one end and said rotor block located on the other end is not more than a pole pitch angle of said rotor.

2. A method of manufacturing a brushless DC motor of claim 1, wherein said permanent magnets of said rotor are produced by magnetizing said rotor blocks or rotor by using said stator as a magnetic yoke after assembling the motor.

3. A brushless DC motor comprising:

a rotor having plural permanent magnets; and a stator having plural slots, wherein each of said permanent magnets is divided into three permanent magnets in a rotation axis direction, and said three permanent magnets are layered so that arrangement angles of said permanent magnets differ from each other by an amount of a mechanical angle in a rotary direction that is equivalent to one third of a pulsation period of cogging torque generated by said rotor and stator;

wherein a sum of an effective polar opening angle of one of said permanent magnets and a difference between the arrangement angles of said permanent magnets located on both ends in the rotation axis direction of said three permanent magnets is not more than a pole pitch angle of said rotor.

* * * * *